(12) United States Patent
Steiner et al.

(10) Patent No.: US 6,741,788 B2
(45) Date of Patent: May 25, 2004

(54) EFFICIENT LIGHT DISTRIBUTION SYSTEM

(75) Inventors: Ivan B. Steiner, Ridgewood, NJ (US); Robert J. Saccomanno, Montville, NJ (US)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 10/154,680

(22) Filed: May 23, 2002

(65) Prior Publication Data

US 2003/0002296 A1 Jan. 2, 2003

Related U.S. Application Data

(63) Continuation of application No. 09/346,253, filed on Jul. 1, 1999, now Pat. No. 6,428,198.

(51) Int. Cl.[7] .............................. G02B 6/04; F21V 7/04

(52) U.S. Cl. ...................... 385/901; 385/33; 385/115; 362/551; 362/559

(58) Field of Search ................................ 362/551, 560, 362/581, 554, 559; 385/43, 33–34, 39, 115–116, 119–121, 901

(56) References Cited

U.S. PATENT DOCUMENTS

| 2,604,005 | A | | 7/1952 | Hahn |
| 3,676,667 | A | | 7/1972 | Malifaud |
| 4,306,716 | A | * | 12/1981 | James et al. ................... 463/31 |
| 5,462,700 | A | * | 10/1995 | Beeson et al. ............... 385/146 |
| 5,799,126 | A | * | 8/1998 | Nagatani et al. .............. 385/43 |
| 5,967,653 | A | * | 10/1999 | Miller et al. .................. 385/43 |
| 6,061,489 | A | * | 5/2000 | Ezra et al. ................... 385/115 |

* cited by examiner

Primary Examiner—Akm Enayet Ullah
Assistant Examiner—Omar Rojas
(74) Attorney, Agent, or Firm—Kurt Luther; James W. Falk

(57) ABSTRACT

High luminance display devices, typically utilized in applications requiring sunlight readability, require unique design methodologies as the thickness approaches a maximum of one-inch. The present invention relates to a high-intensity light generation engine and associated light transmission apparatus for transmitting the light generated by the engine to a remote location. The invention is especially applicable for use in constructing a back lighted display, such as a liquid crystal display (LCD), of minimal thickness, i.e., one-inch or less. A display of minimal thickness is achieved by separating a light source and other peripherals from the display device, using a remote enclosure. Such a display is most suited for use in high ambient lighting conditions where space is at a premium, such as in the cockpit of an aircraft.

1 Claim, 24 Drawing Sheets

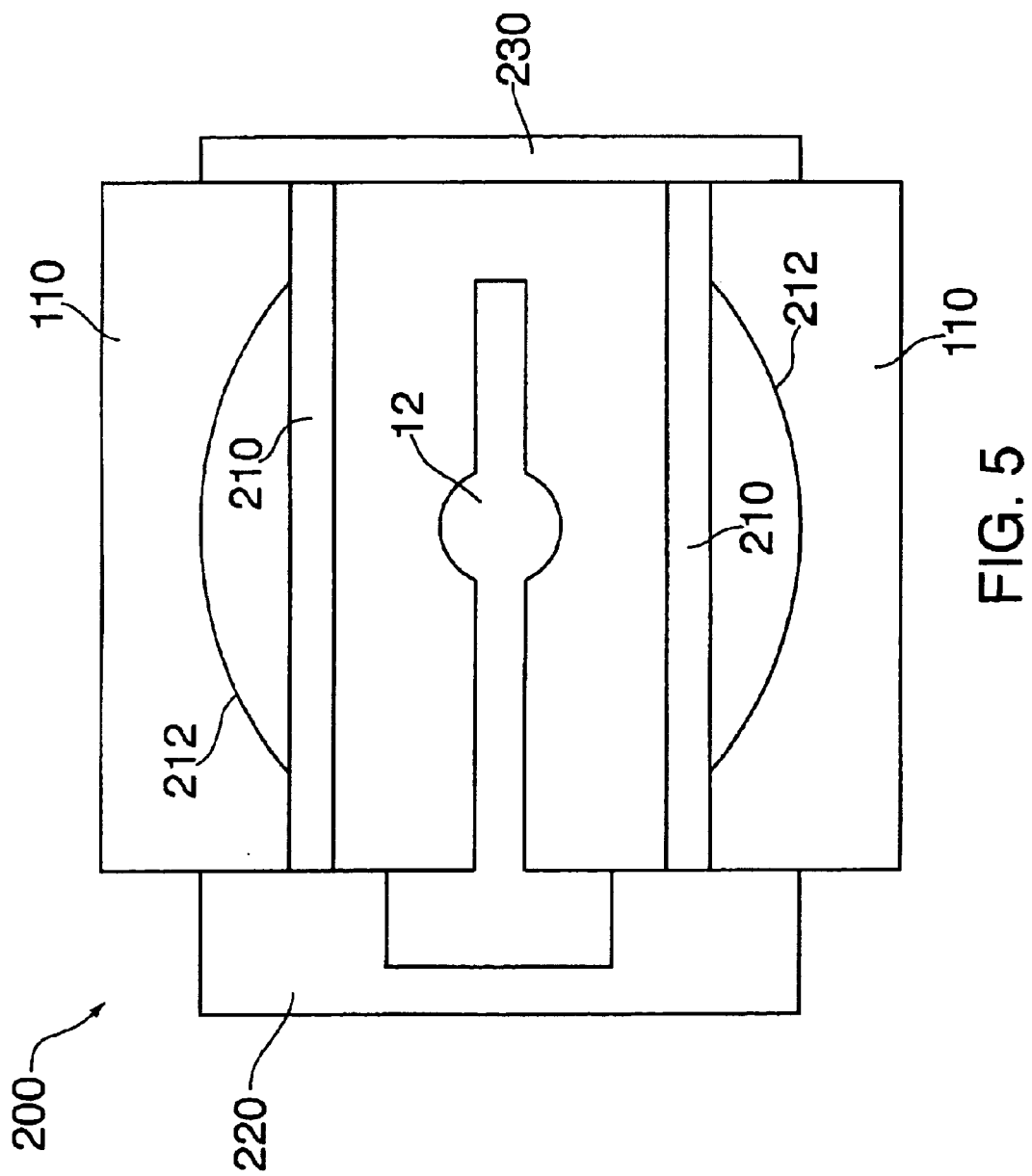

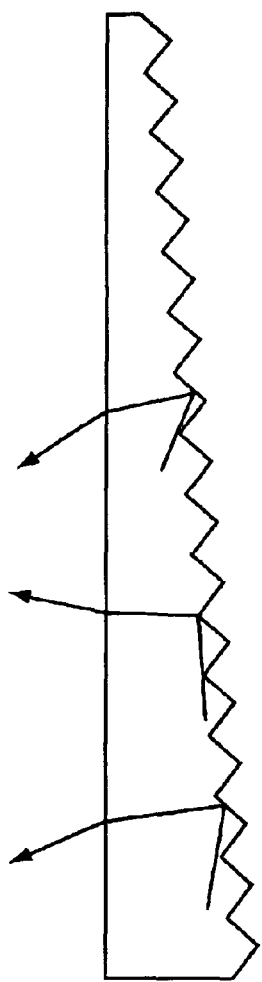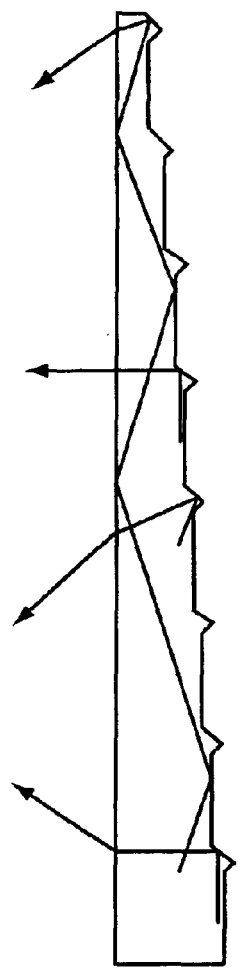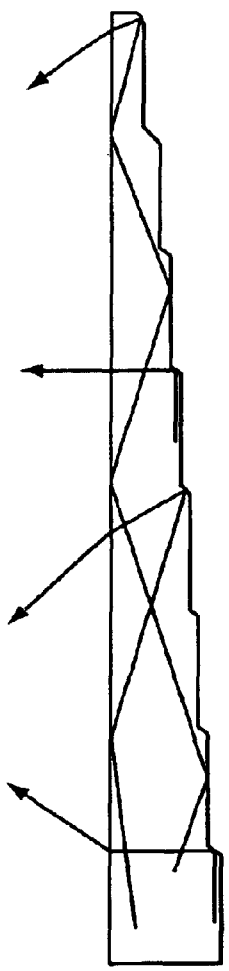
FIG. 15
FIG. 16
FIG. 17
(PRIOR ART)

EFFICIENT LIGHT DISTRIBUTION SYSTEM

This application is a continuation of application Ser. No. 09/346,253 filed Jul. 1, 1999 now U.S. Pat. No. 6,428,198.

FEDERALLY SPONSORED RESEARCH OR DEVELOPMENT

Not Applicable

BACKGROUND OF THE INVENTION

1. Technical Field

The present invention relates to a high-intensity light generation engine and associated light transmission apparatus for transmitting the light generated by the engine to a remote location. The invention is especially applicable for use in constructing a back lighted display, such as a liquid crystal display (LCD), of minimal thickness. In particular, the invention achieves a display of minimal thickness by separating the light source from the display mechanism. Such a display is most suited for use in high ambient lighting conditions where space is at a premium, such as in the cockpit of an aircraft. The inventive light generation engine and associated light transmissive apparatus may also be used for other applications besides illuminating a display, such as for projection displays, ground vehicle instrument displays, automotive lighting (such as headlights, tail lights, panel lights, map lights, and dome lights), airport runway lights, aircraft interior lighting, and street lights.

2. Background Art

Typically, high luminance displays (e.g. those used in avionics applications) are based upon transmissive liquid crystal displays (LCDs) with one or more fluorescent lamps. When packaged in a reflecting cavity and supplemented by light control films, such lamps can be driven at sufficient power levels to generate enough lumens to produce well in excess of 200 fL out of the transmissive LCD. Typically, these displays are at least three inches thick when combined with a minimal amount of electronics. As more electronics are added to increase functionality, display thickness increases correspondingly. Additionally, for avionics applications, the active display area must occupy a large percentage of the overall enclosure area since instrument panel space is at a premium. This further complication increases packaging density, and as the packaging density increases, the thermal design obviously becomes more critical. Beyond approximately 0.1 watts per cubic inch, active cooling should be employed, which is generally fan-based, thus further increasing volume.

There exists a desire to drive the display thickness to less than one inch for many applications, such as avionics. For avionics applications, this would facilitate upgrading a cockpit with new displays requiring minimal modification of the cockpit instrument panel and surrounding structural members. Obsolete displays may be removed and replaced by new displays, including those which relate to the present invention, that simply attach over the existing instrument panel. Most avionics displays protrude in front of an instrument panel by no more than one inch. This limitation is due to several factors, such as the need to preclude one display from shadowing another. Another consideration is that displays cannot protrude into the 'ejection envelope' in fighter and attack planes and also cannot interference with the controls used by a crewmember (such as, for example, limiting full travel of the control yoke).

To achieve high luminance, high contrast, and high resolution in a conventional display intended for high ambient lighting conditions, considerable display thickness and relatively high-intensity light sources are required. However, thick displays and the large amounts of heat generated by high intensity lamps are adverse to certain applications, such as those for the cockpit of an airplane.

In view of the foregoing, this invention provides a display system in which the light source is located remotely from a display device, such as an LCD, and its backlight. By separating the lamp, driving electronics and other components from the display device and locating them remotely, space requirements can be satisfied without violating the severe envelope restrictions for aircraft cockpit-suitable display system elements.

This invention also provides a high-intensity light engine comprising a light source and a light collection assembly, and an optical transmission apparatus for transmitting the light to a remote location, such as to a display device.

SUMMARY OF THE INVENTION

The present invention is directed to a high-intensity light generation engine and associated light transmission apparatus for transmitting the light generated by the engine to a remote location. The invention is especially applicable for use in constructing a back lighted display, such as a liquid crystal display (LCD), of minimal thickness, i.e., one-inch or less. A display of minimal thickness is achieved by separating the light source and other peripherals from the display device. Accordingly, the light source and other light transmissive apparatus are comprised in a remote enclosure. Such a display is most suited for use in high ambient lighting conditions where space is at a premium, such as in the cockpit of an aircraft. The inventive light generation engine and associated light transmissive apparatus may also be used for other applications such as projection displays, ground vehicle instrument displays, automotive lighting, airport runway lights, aircraft interior lighting, and street lights.

In accordance with an illustrative embodiment of this invention, a system for illuminating a display, such as a flat panel display (i.e. an LCD) is provided. Several of the systems functional elements are illustratively listed below:

A light source for generating light.

A light collection assembly for collecting the light generated by the light source and for providing one or more light outputs. The light-collecting assembly comprises at least one ellipsoidal mirror, and preferably eight ellipsoidal mirrors, for reflecting the light generated from the light source to corresponding exit port holes.

A light guide assembly for collecting light from the light output(s) and transmitting it to a common exit port.

An optional dimmer for providing a controllable variable attenuation of the light emitted by the light guide assembly common exit port.

A homogenizer for capturing potentially non-uniform light from the optional dimmer or, alternatively, directly from the light guide assembly common exit port, and for providing a uniform irradiance across the homogenizer exit port area. The irradiance across the exit port area generated by the homogenizer also has uniform spectral and angular characteristics. Note that the homogenizer is preferably tapered, where its input port is larger than its output port.

A fiber optic cable assembly for capturing light from the homogenizer exit port and distributing it to multiple exit ports.

A collimator element assembly. Each collimator element captures light from a corresponding light distribution means exit port and projects light with improved collimation.

A turn-the-corner assembly that captures the collimated light projected by the collimator elements and reverses its propagation direction in a space-efficient manner while maintaining collimation.

A waveguide backlight that captures the collimated light from the turn-the-corner assembly and projects it in the direction normal to the backlight exit face.

A liquid crystal display (LCD) that transmits the collimated light projected by the backlight while modulating it spatially and, in non-monochrome applications, spectrally across the LCD area to form an image.

A view screen that transmits the light projected by the LCD while decollimating (or diffusing) it to project the LCD image to be seen over a wide range of viewing angles.

As an aspect of this embodiment, the system further comprises one or more optical light pipes (e.g., a solid cylindrical rod or, alternatively, a square or rectangular cross section solid rod), where each light pipe is coupled to a respective exit port hole of the light-collecting assembly. The light pipes reduce heat concentrations and ultraviolet radiation, generated by the light-collecting assembly, which would otherwise be fully dissipated in the light guides leading to the homogenizer. The light pipes are preferably made of a visible light transparent heat-tolerant material, such as glass, fused silica or sapphire. Further, each light pipe is preferably coated with either a dielectric infrared-reflecting coating, an ultraviolet reflecting coating or a combination thereof.

As a further aspect of this embodiment, the waveguide has a bottom surface having either a sawtooth or a truncated sawtooth surface for directing light out of the waveguide at predetermined angles based on the size and shape of the sawtooth and truncated sawtooth surfaces.

As an additional aspect of this embodiment, the system includes an apparatus for redirecting light, such as a turn-the-corner prism assembly, positioned preceding the waveguide. Illustratively, this assembly has one or more prisms, where each prism includes an input surface, an output surface, and in the case where there are a plurality of prisms, an interface between the prisms (such as a thin adhesive or glue gap) to improve the light-handling efficiency of the assembly. In particular, the adhesive preferably has an index of refraction less than the index of refraction of the adjacent prisms.

The system also includes an electro-mechanical dimmer for attenuating the light entering the homogenizer. The dimmer disposed immediately preceding the homogenizer entrance port is configured to have a dimming ratio from 300:1 to 88,500:1. The dimmer comprises a pair of aperture plates, where each plate has a diamond-shaped aperture. One of these may include a filter therein. However, differently shaped apertures can also be configured to provide the same function.

As yet a further aspect of this embodiment, the system further includes an array of collimators, positioned immediately preceding the turn-the-corner prism assembly, for collimating the homogenized light. Illustratively, the collimator comprises an array of tapered cavities, where the array's tapered cavities have either round, square, or triangular cross-sections, or combinations thereof.

BRIEF DESCRIPTION OF DRAWINGS

Figure 1A:
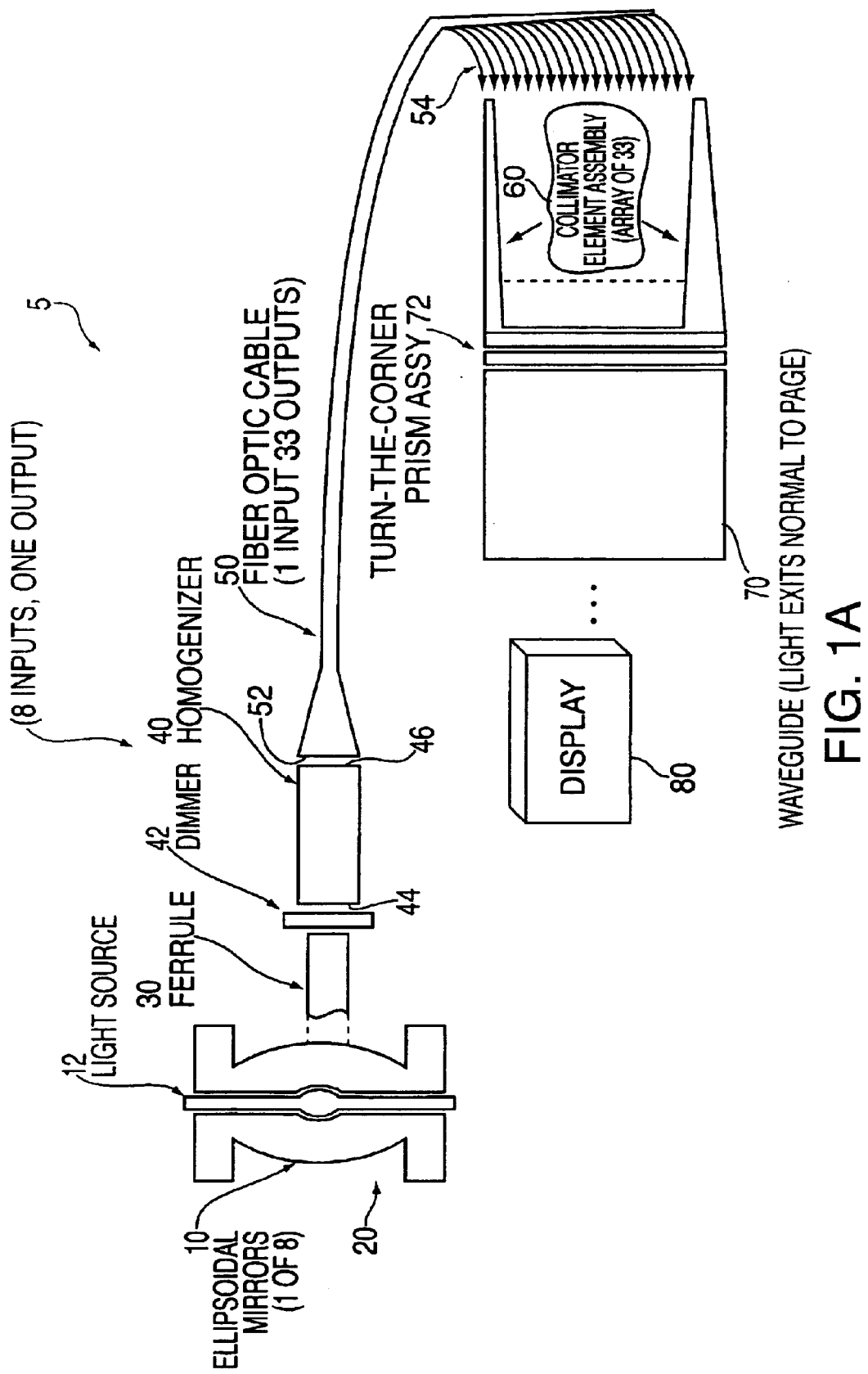

Brief Description of the Several Views of the Drawing

FIG. 1A is a block diagram of a flat panel display system in accordance with an embodiment of the present invention.

Figure 1B:
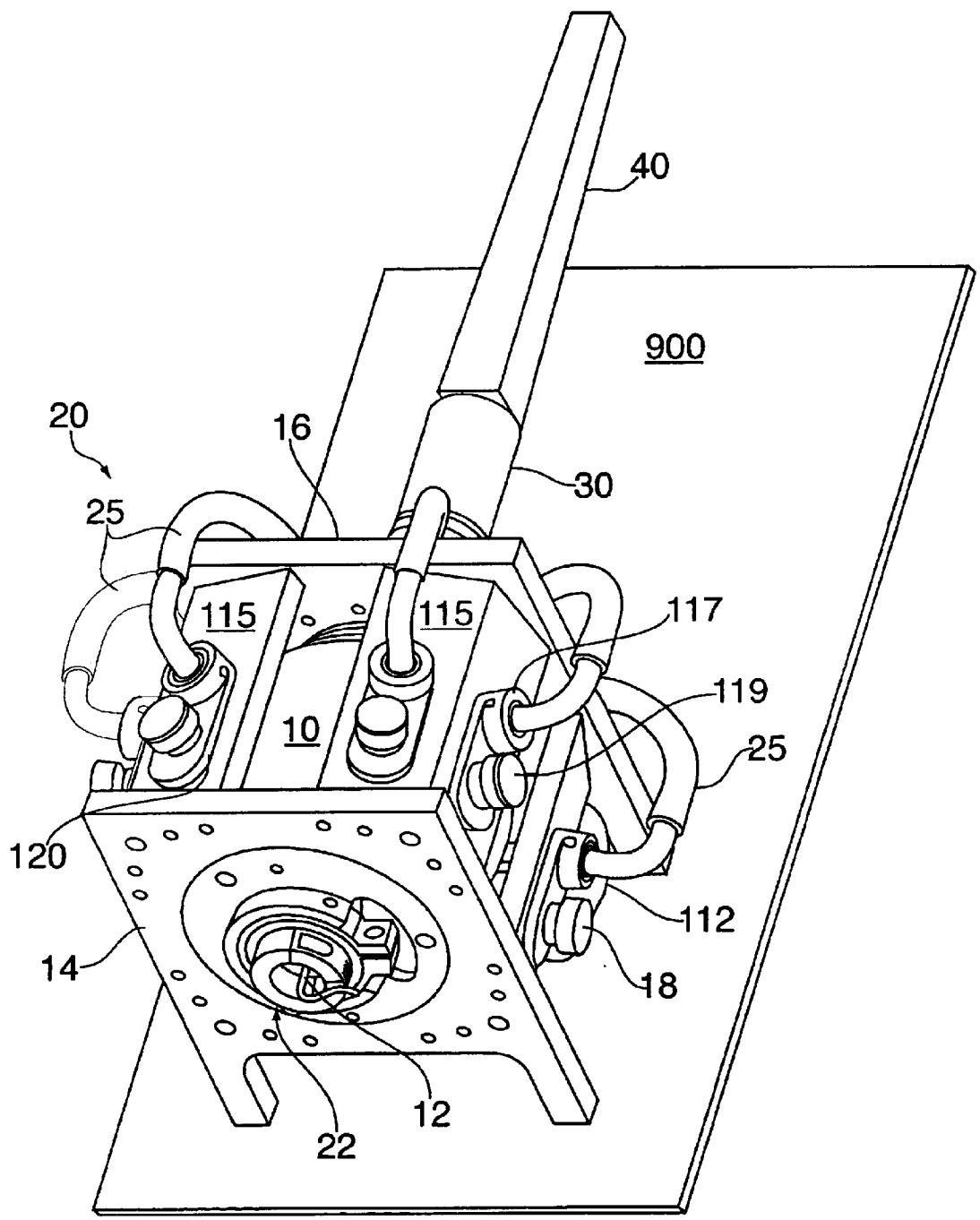

FIG. 1B is a bottom perspective view of a portion of the flat panel display system of FIG. 1A in accordance with the present invention.

Figure 1C:
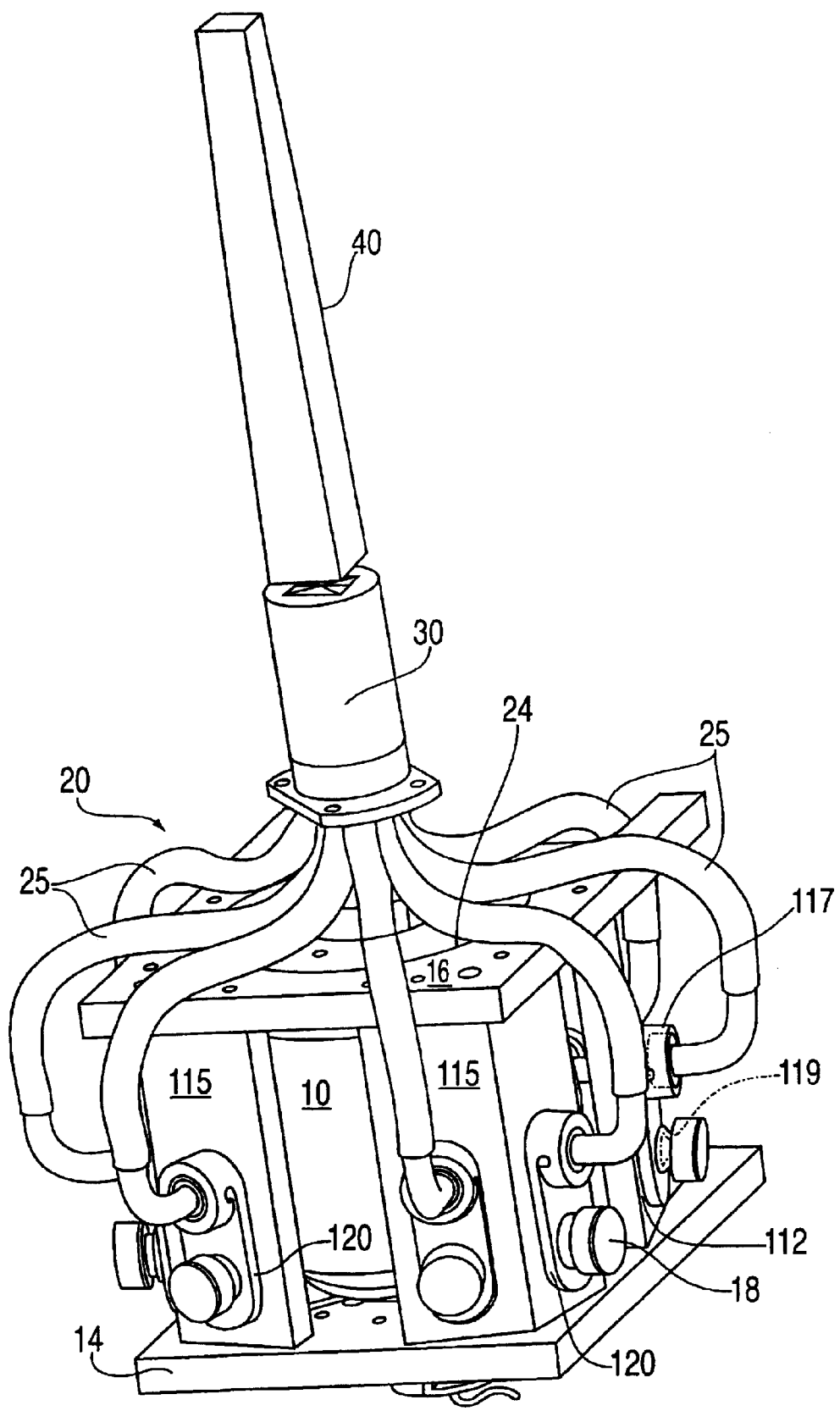

FIG. 1C is a top perspective view of a portion of the flat panel display system of FIG. 1A in accordance with the present invention.

Figure 2A:
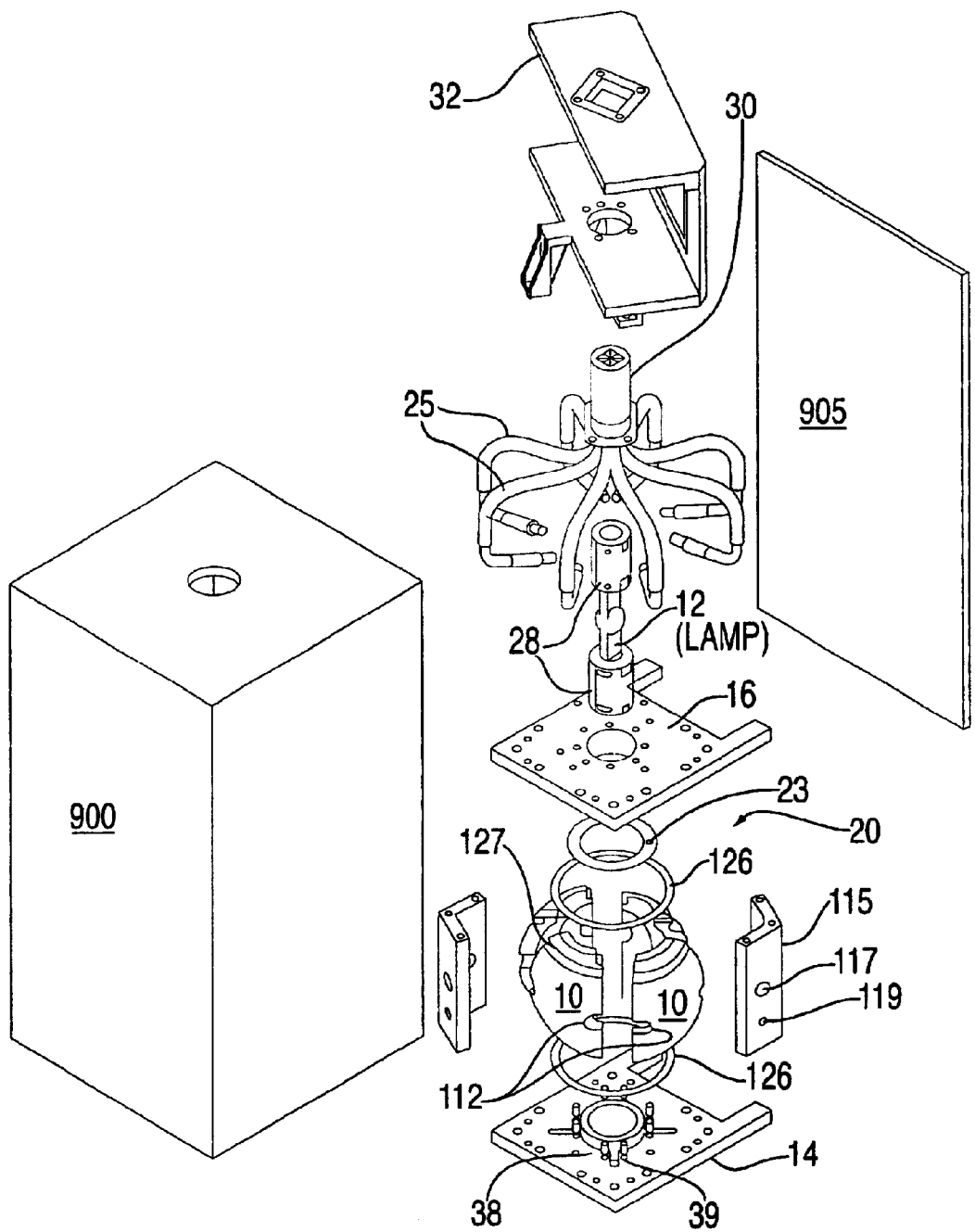

FIG. 2A is an exploded view of a portion of a flat panel display system including brackets and a remote enclosure in accordance with the present invention.

Figure 2B:
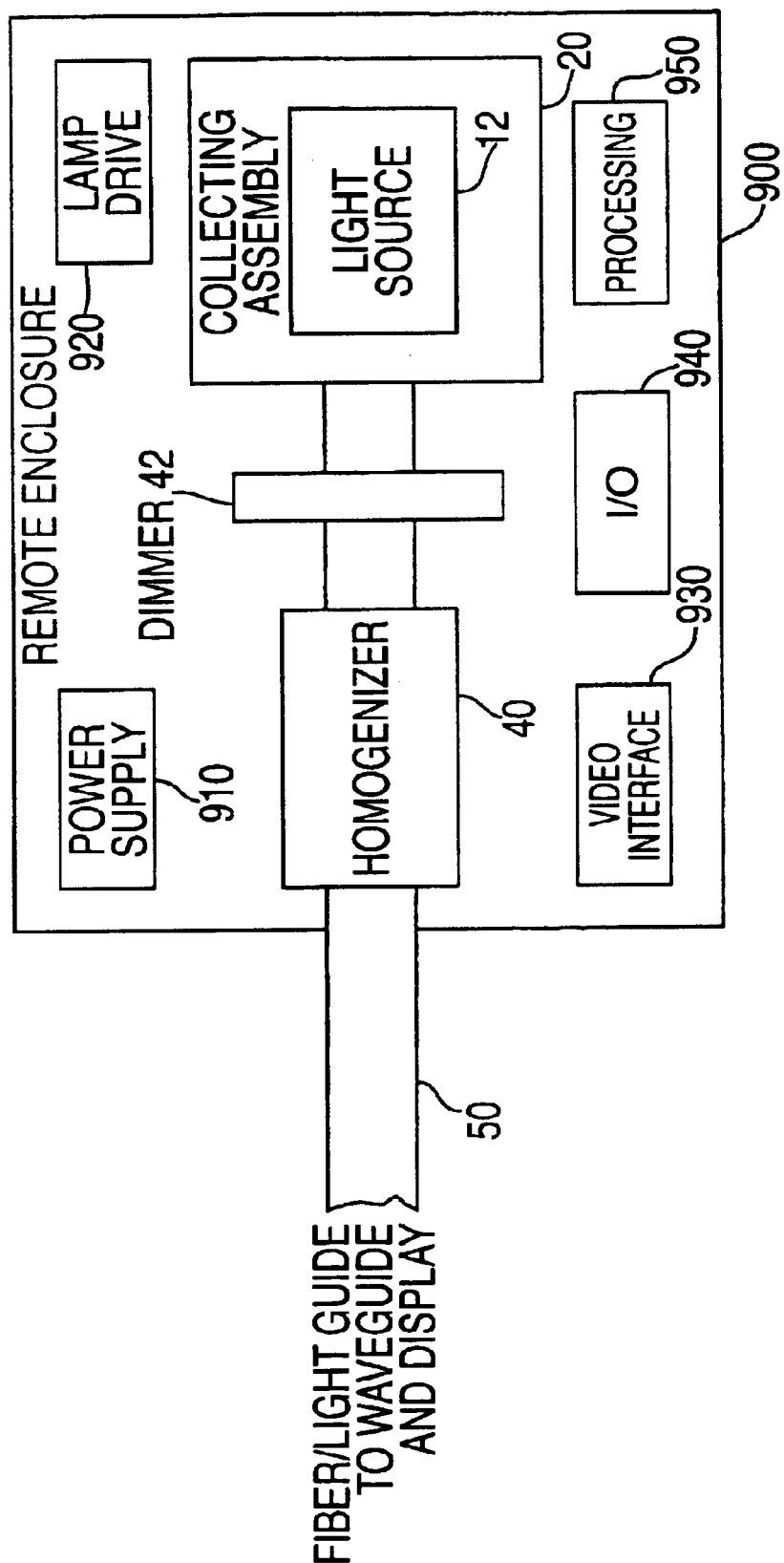

FIG. 2B is a block diagram of a portion of the flat panel display system of FIG. 1A including other peripherals in accordance with the present invention.

Figure 2C:
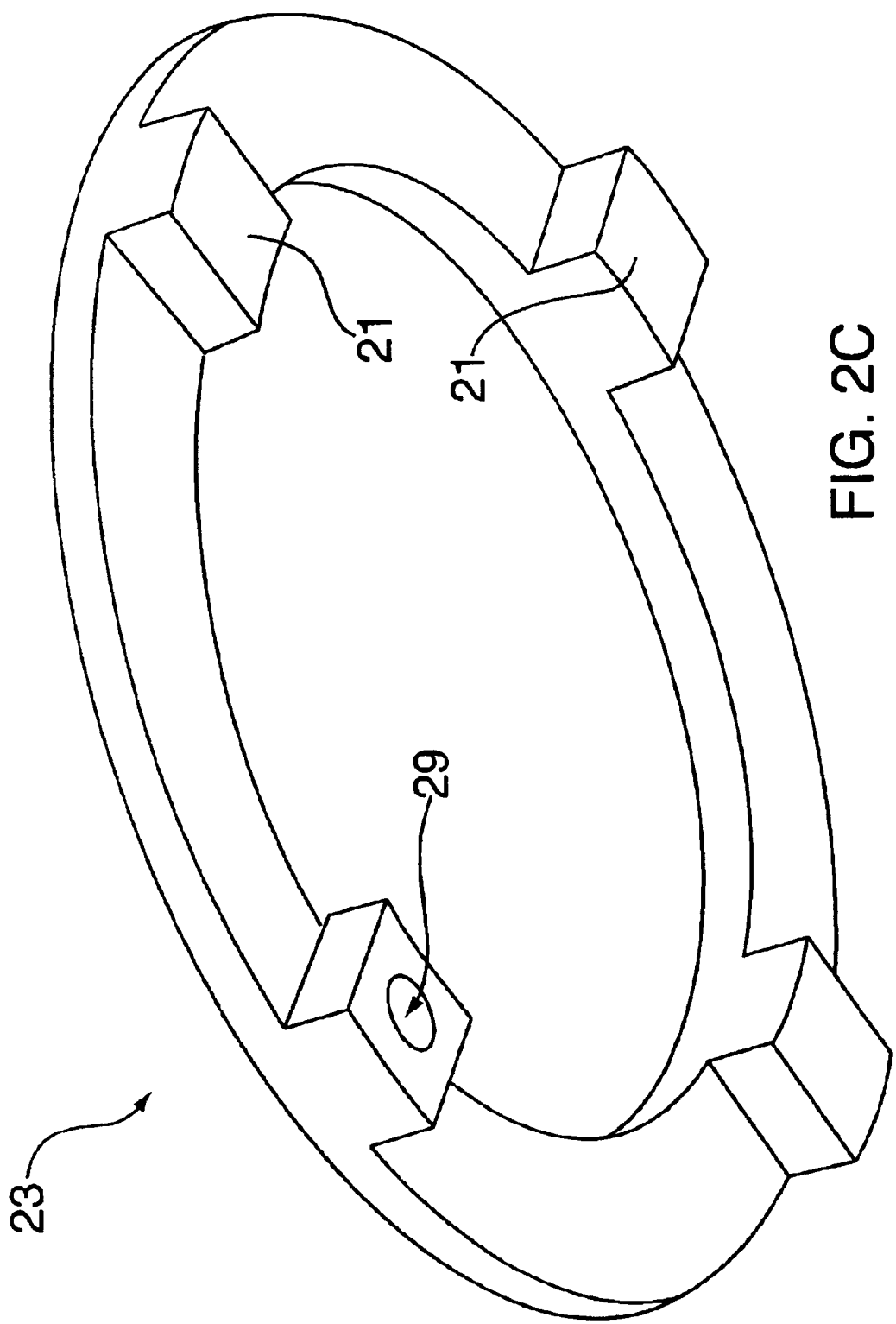

FIG. 2C is a bottom perspective view of a special alignment washer in accordance with the present invention.

Figure 3:
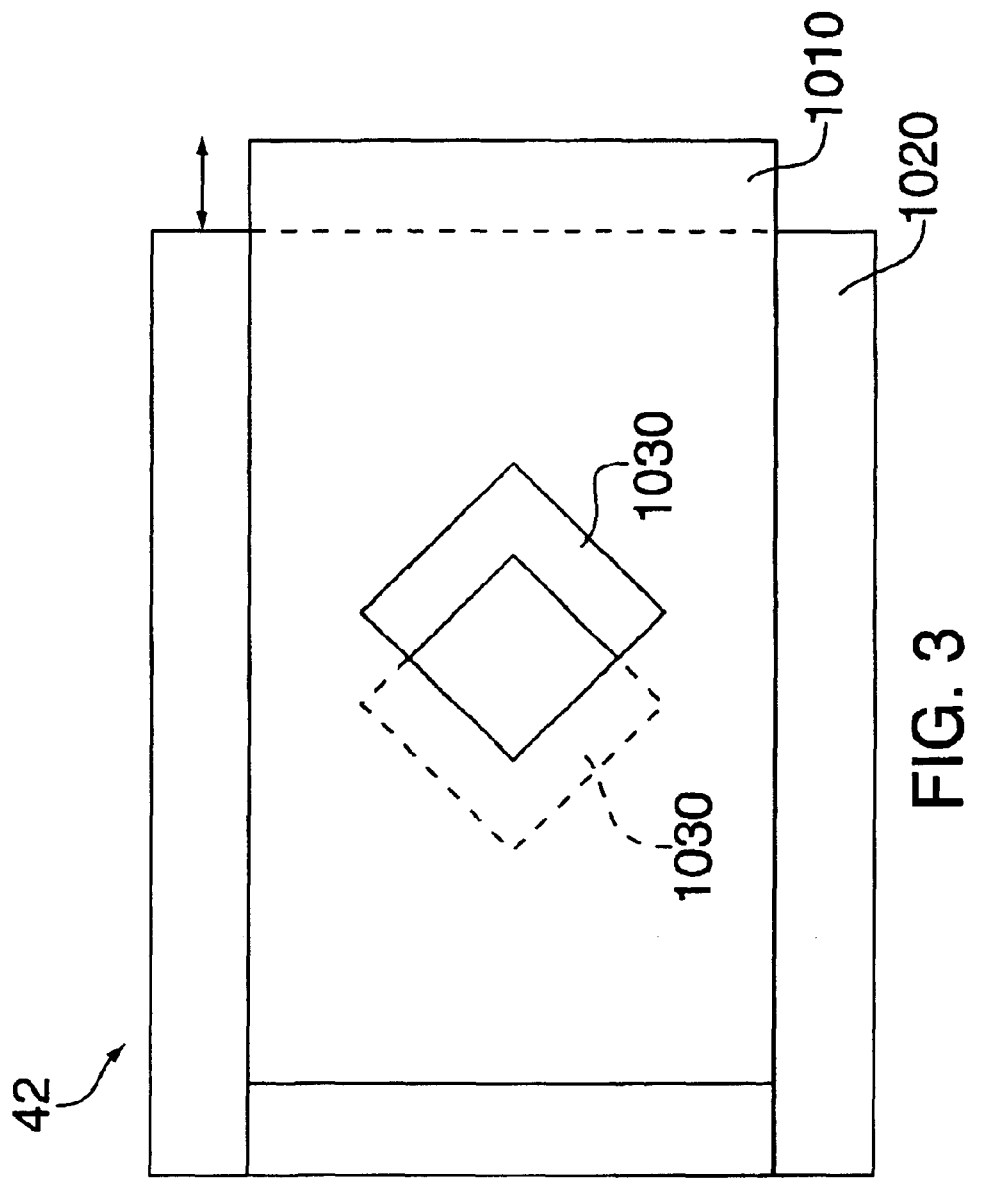

FIG. 3 shows a dimmer device optionally used in the flat panel display system of FIG. 1A in accordance with the present invention.

Figure 4A:
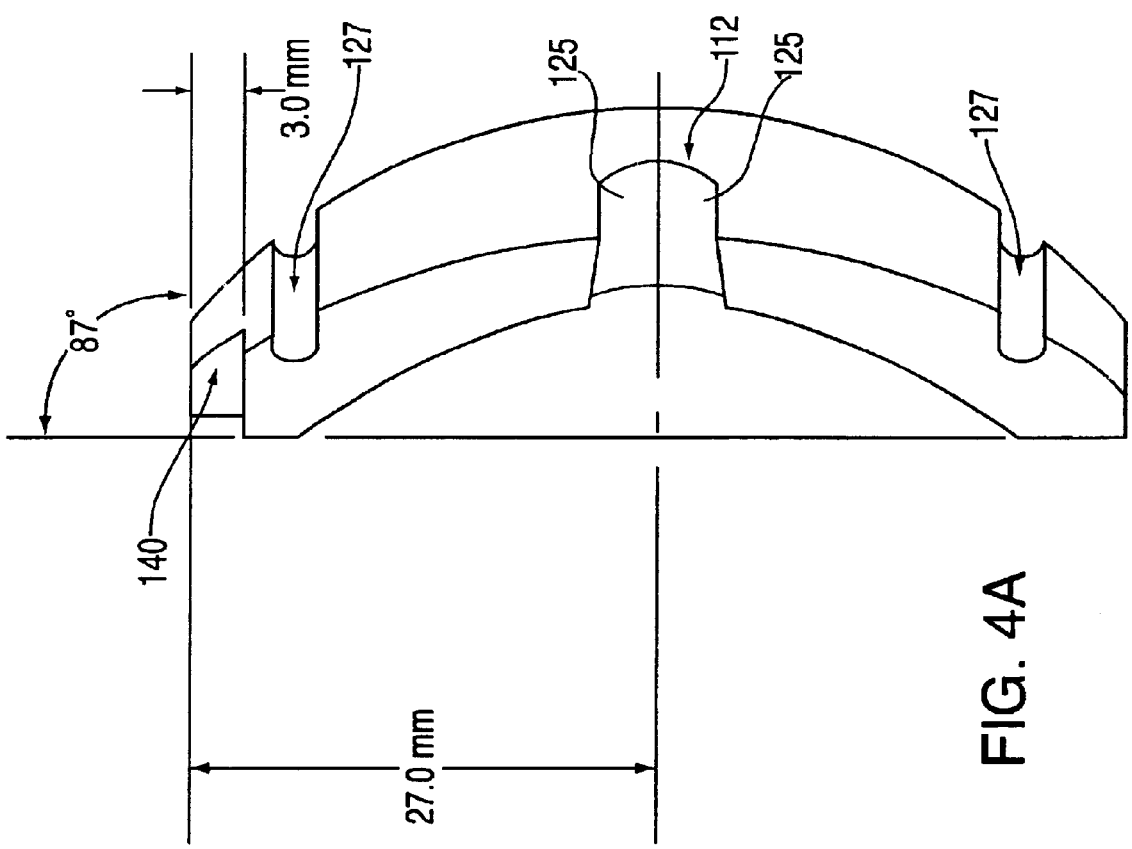
Figure 4B:
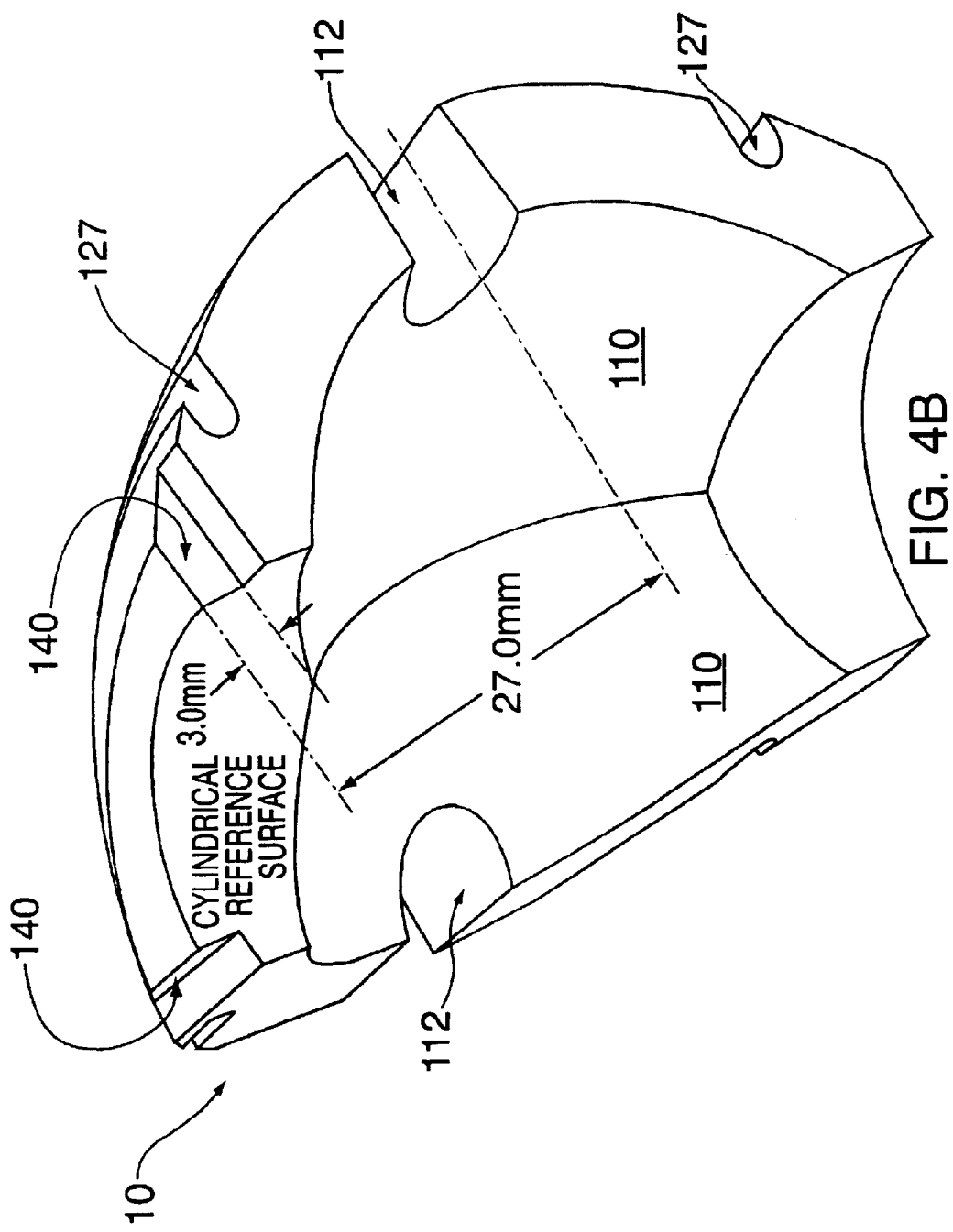
Figure 4C:
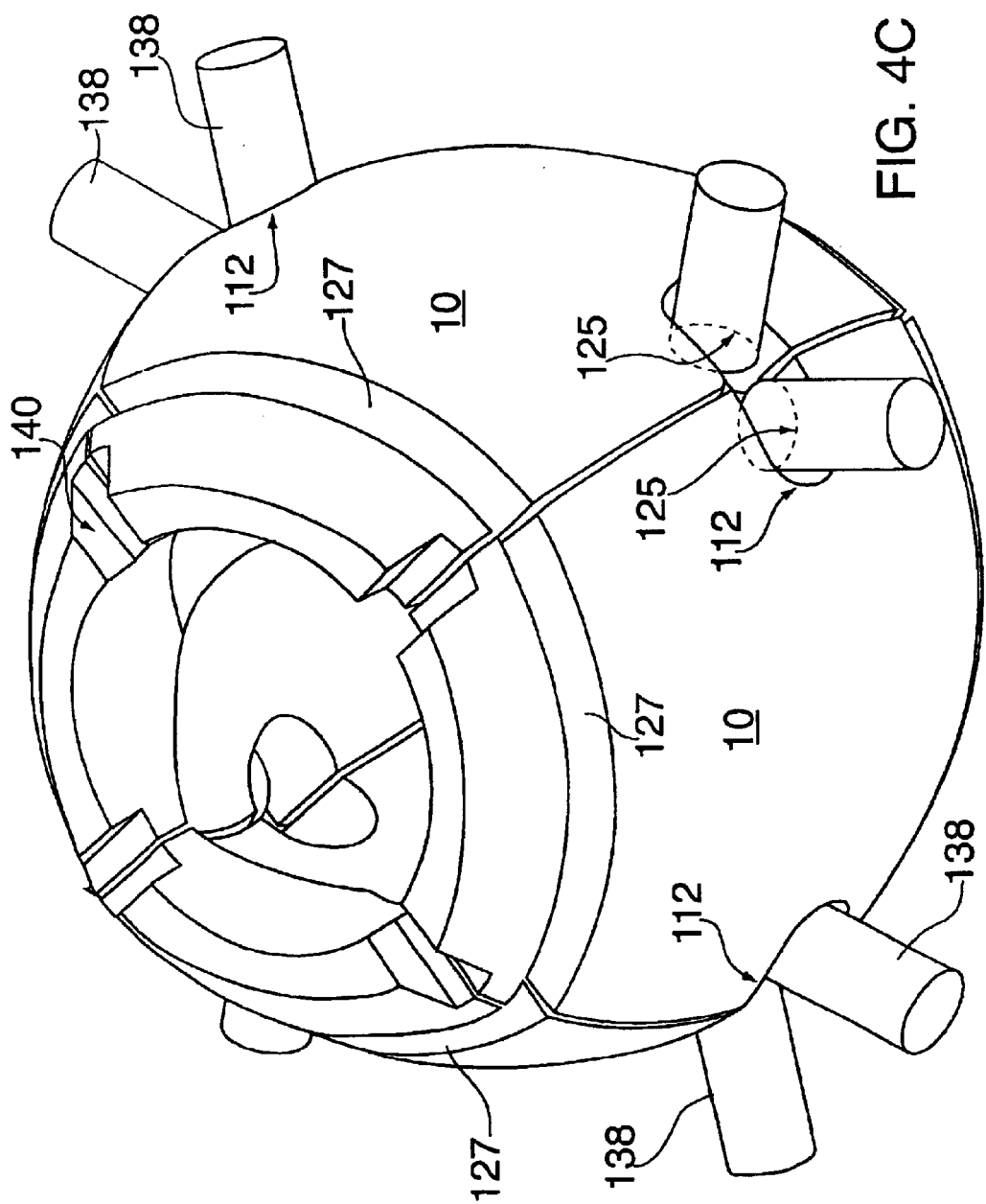

FIGS. 4A, 4B, and 4C are side elevation, isometric, and assembly views, respectively, of the light-collecting assembly of FIGS. 1B and 1C in accordance with the present invention.

FIG. 5 is a lamp and cooling assembly of the flat panel display system of FIG. 1A in accordance with an embodiment of the present invention.

Figure 6:
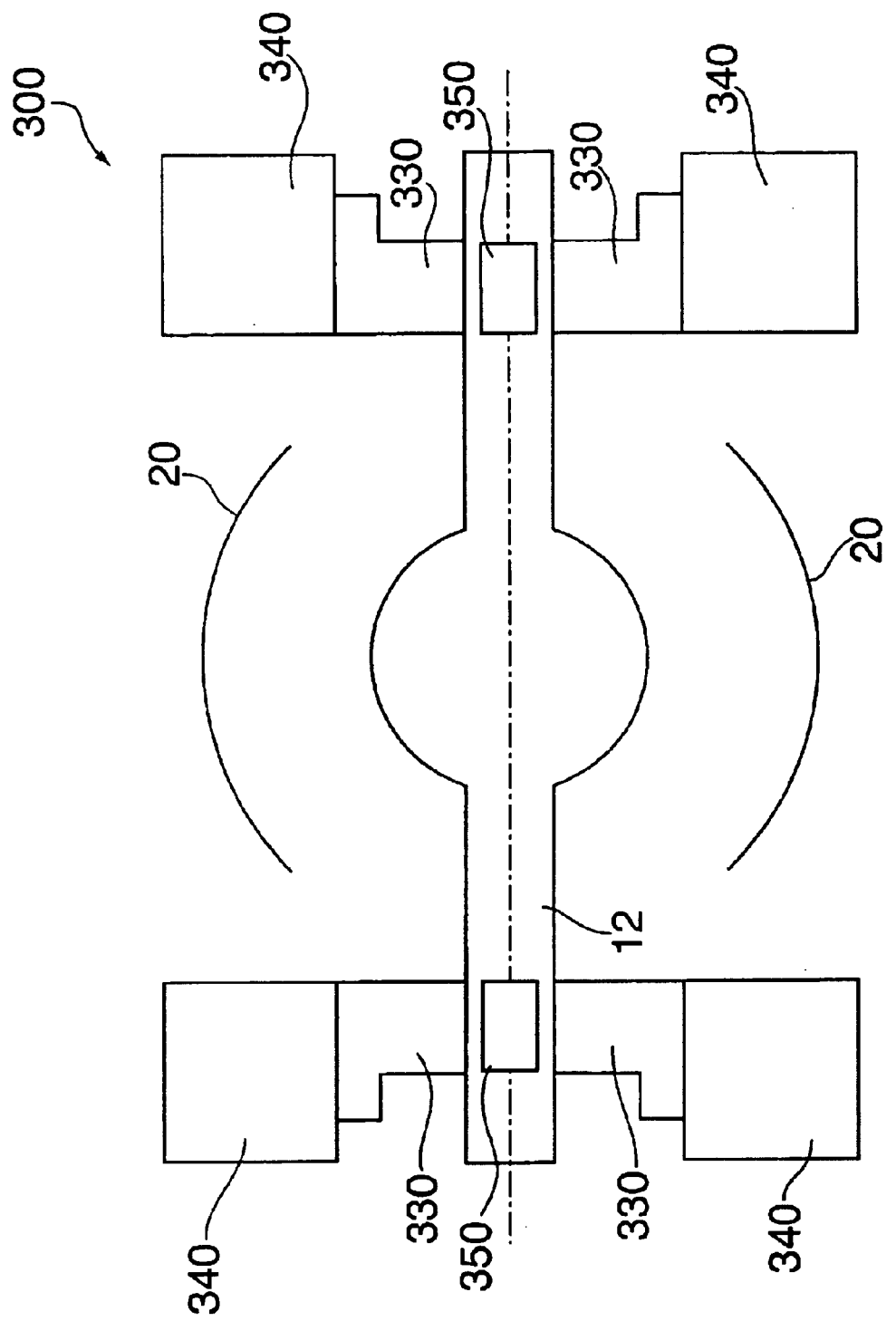

FIG. 6 is a lamp and cooling assembly of the flat panel display system of FIG. 1A in accordance with a further embodiment of the present invention.

Figure 7:
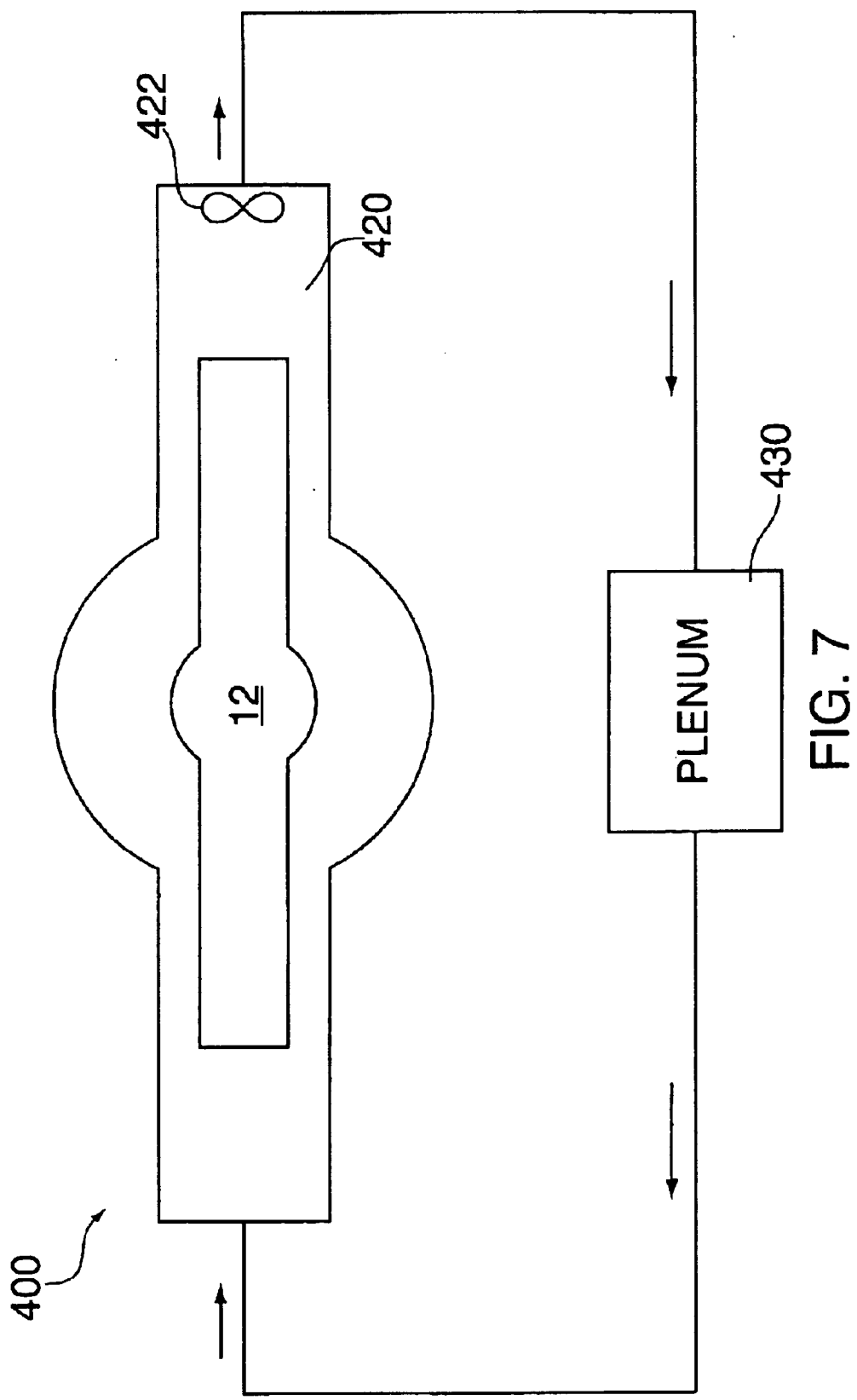

FIG. 7 is a lamp and cooling assembly of the flat panel display system of FIG. 1A in accordance with yet a further embodiment of the present invention.

Figure 8:
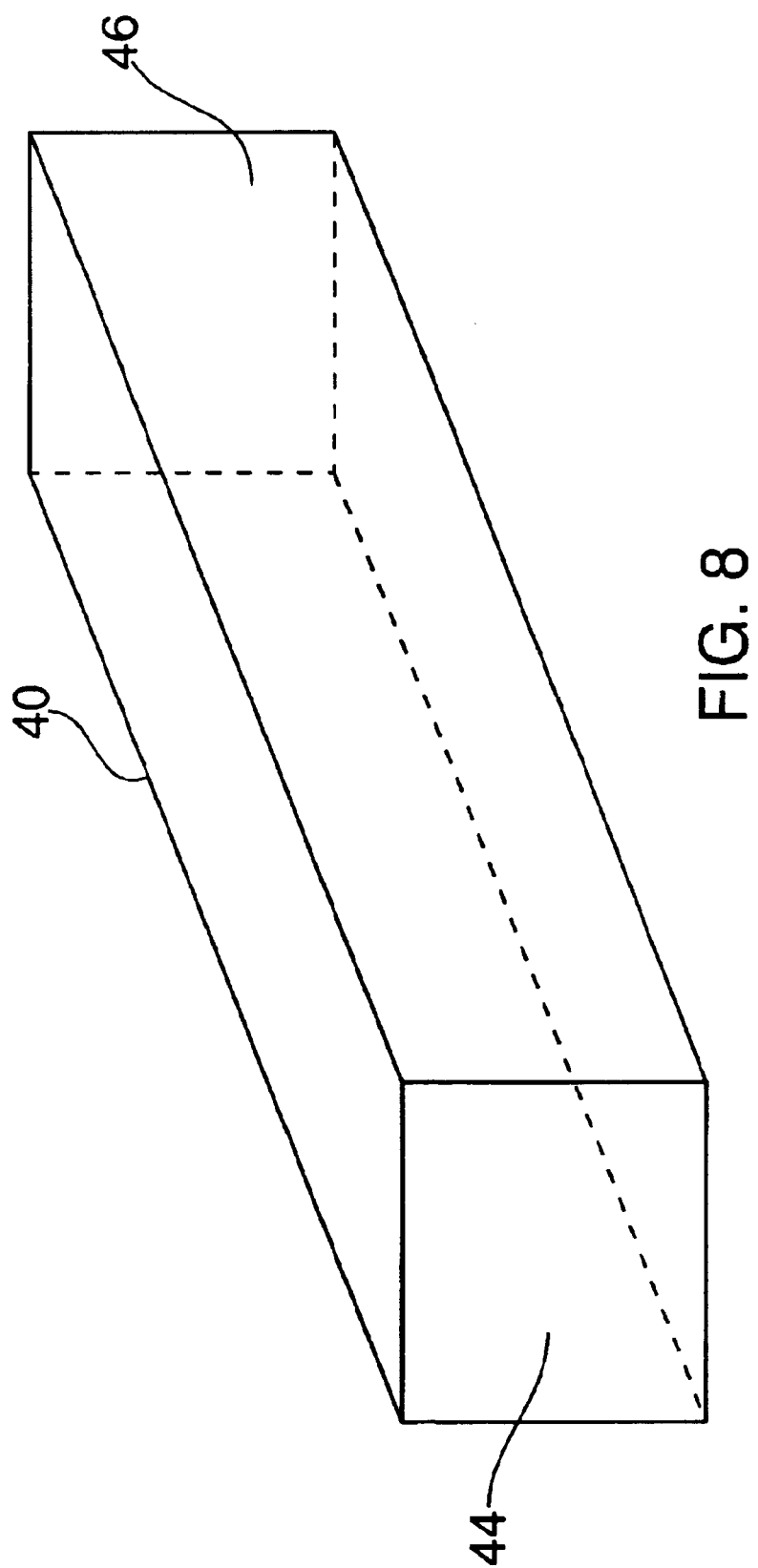

FIG. 8 is a perspective view of the homogenizer of the flat panel display system of FIG. 1A in accordance with the present invention.

Figure 9:
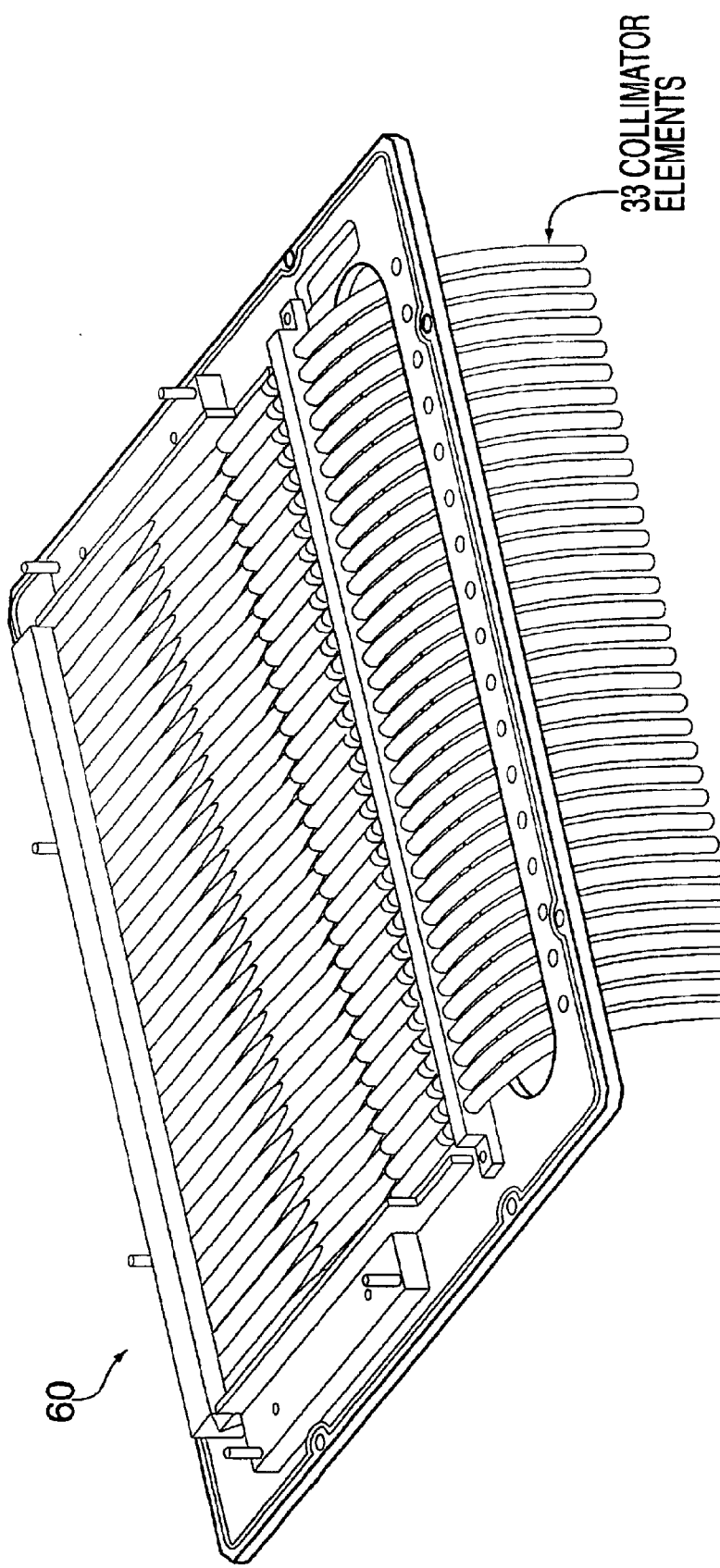

FIG. 9 illustrates an embodiment of a square collimator array of the flat panel display system of FIG. 1A in accordance with an embodiment the present invention.

Figure 10A:
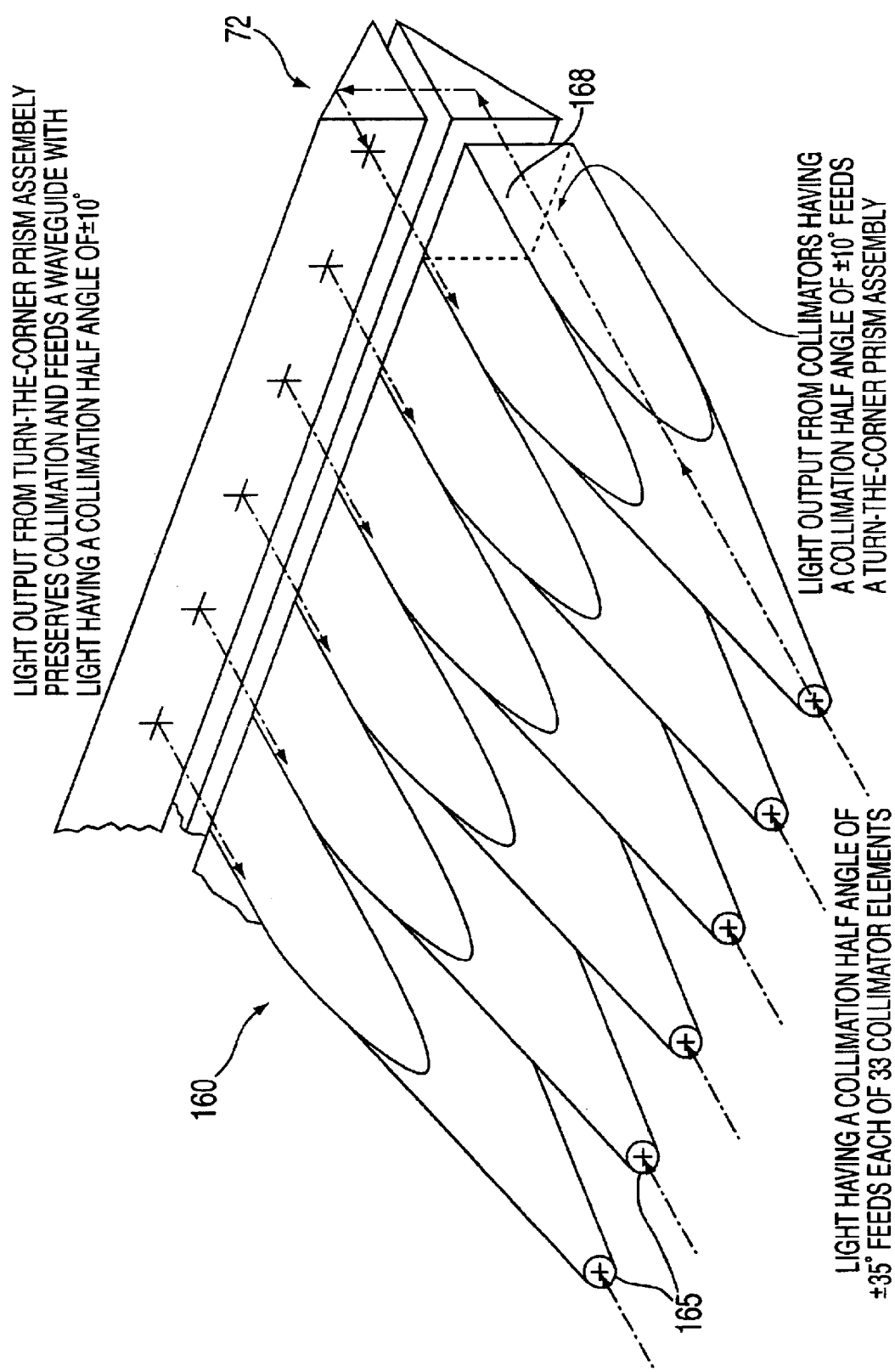

FIG. 10A illustrates an embodiment of a detail of the array of collimator elements in the flat panel display system of FIG. 1A in accordance with a preferred embodiment of the present invention.

Figure 10B:
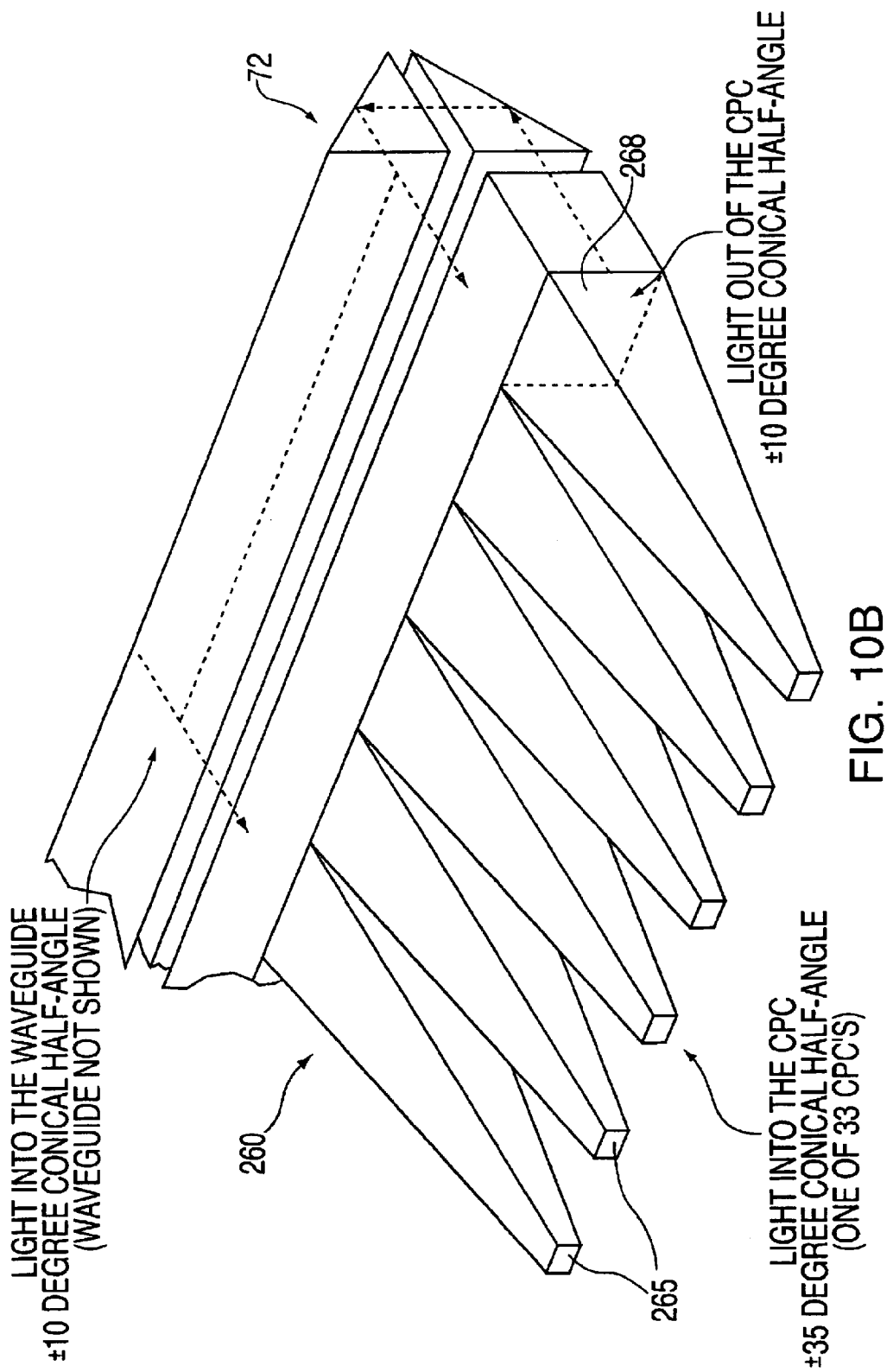

FIG. 10B illustrates an embodiment of a detail of the array of collimator elements in the flat panel display system of FIG. 1A in accordance with an alternate embodiment of the present invention.

Figure 11:
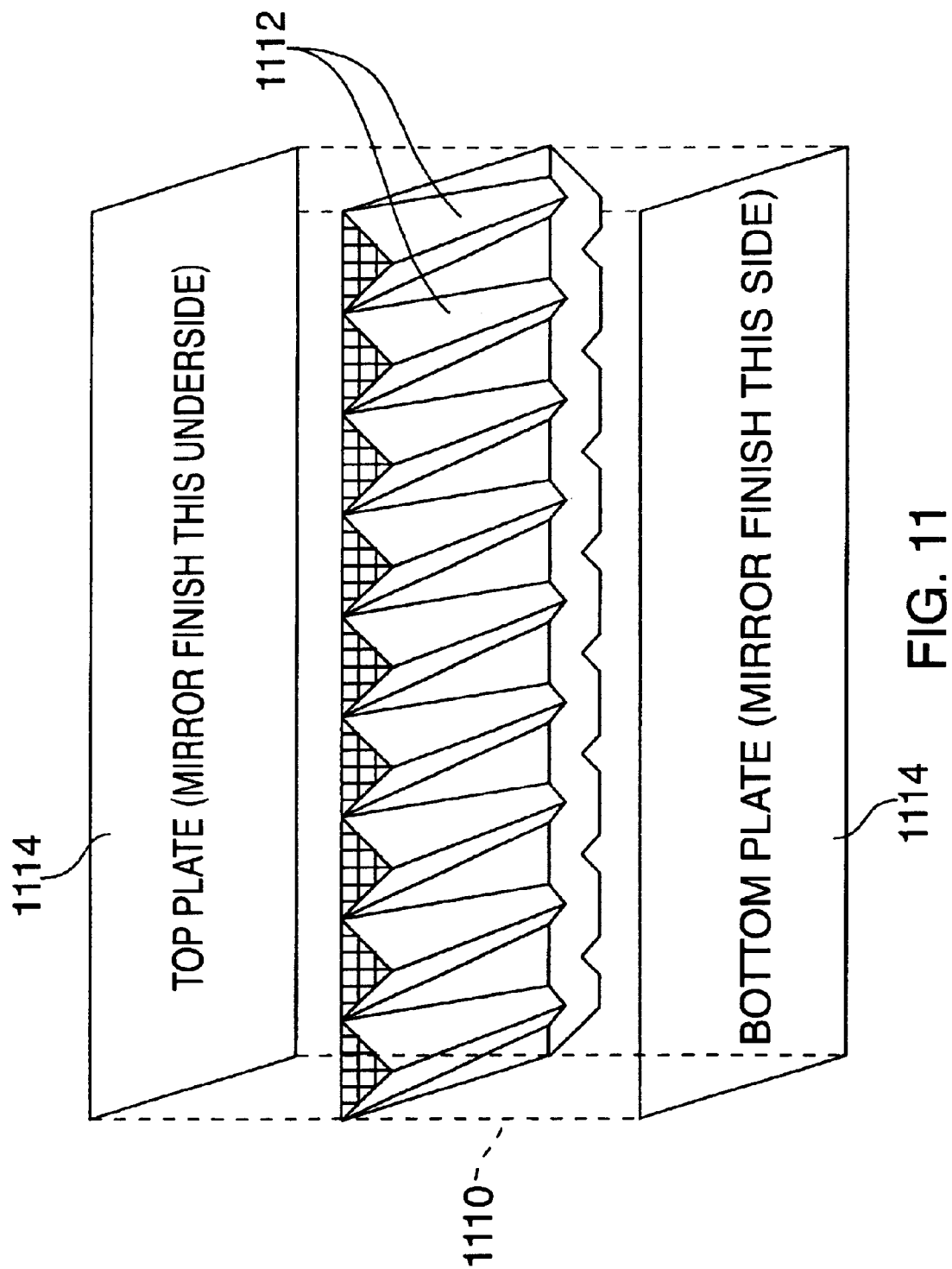

FIG. 11 illustrates an embodiment of a packed triangular air cavity collimator array of the flat panel display system of FIG. 1A in accordance with a further embodiment of the present invention.

Figure 12:
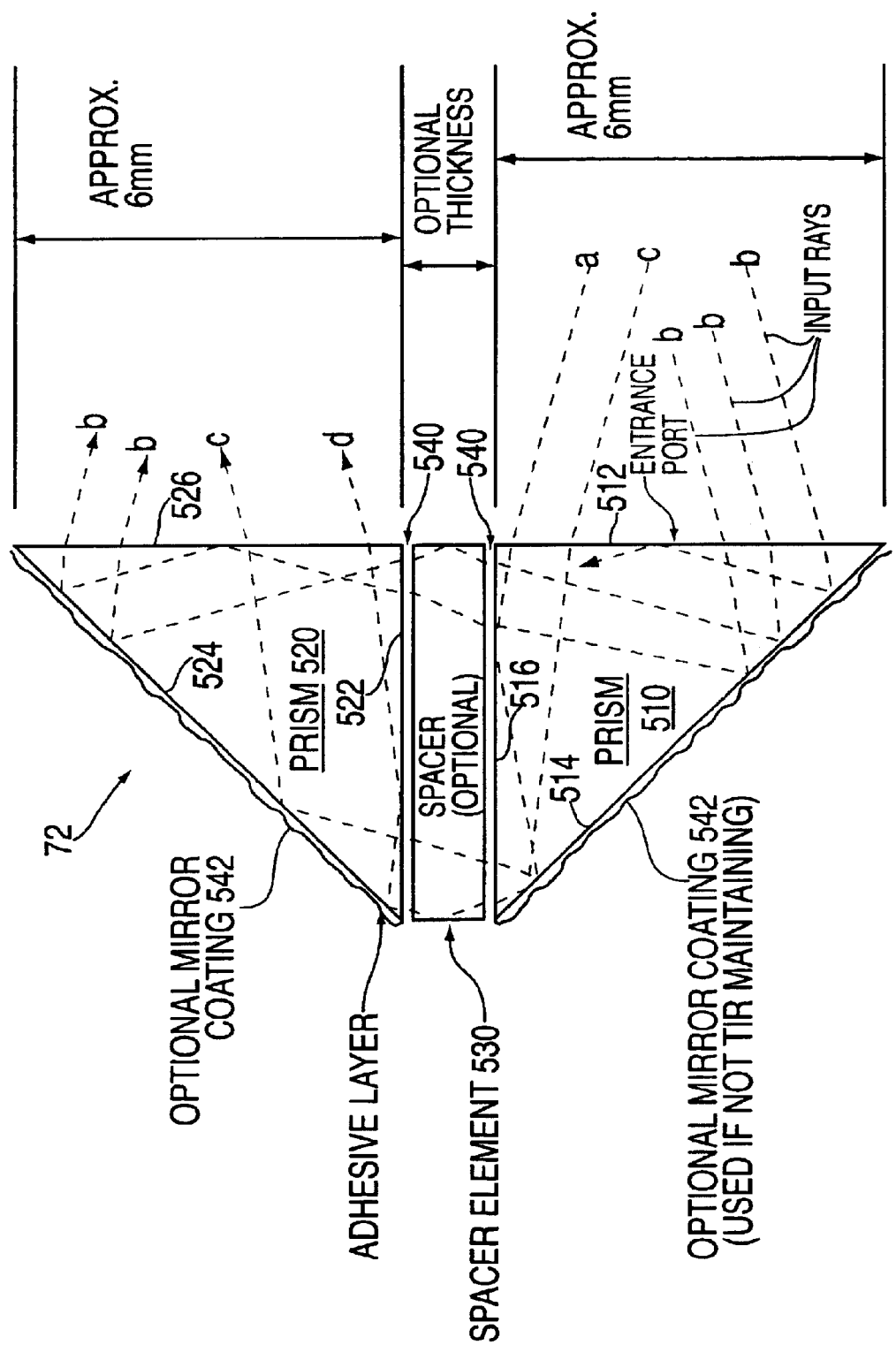

FIG. 12 illustrates an embodiment of a turn-the-corner assembly of the flat panel display system of FIG. 1A in accordance with an embodiment the present invention.

Figure 13:
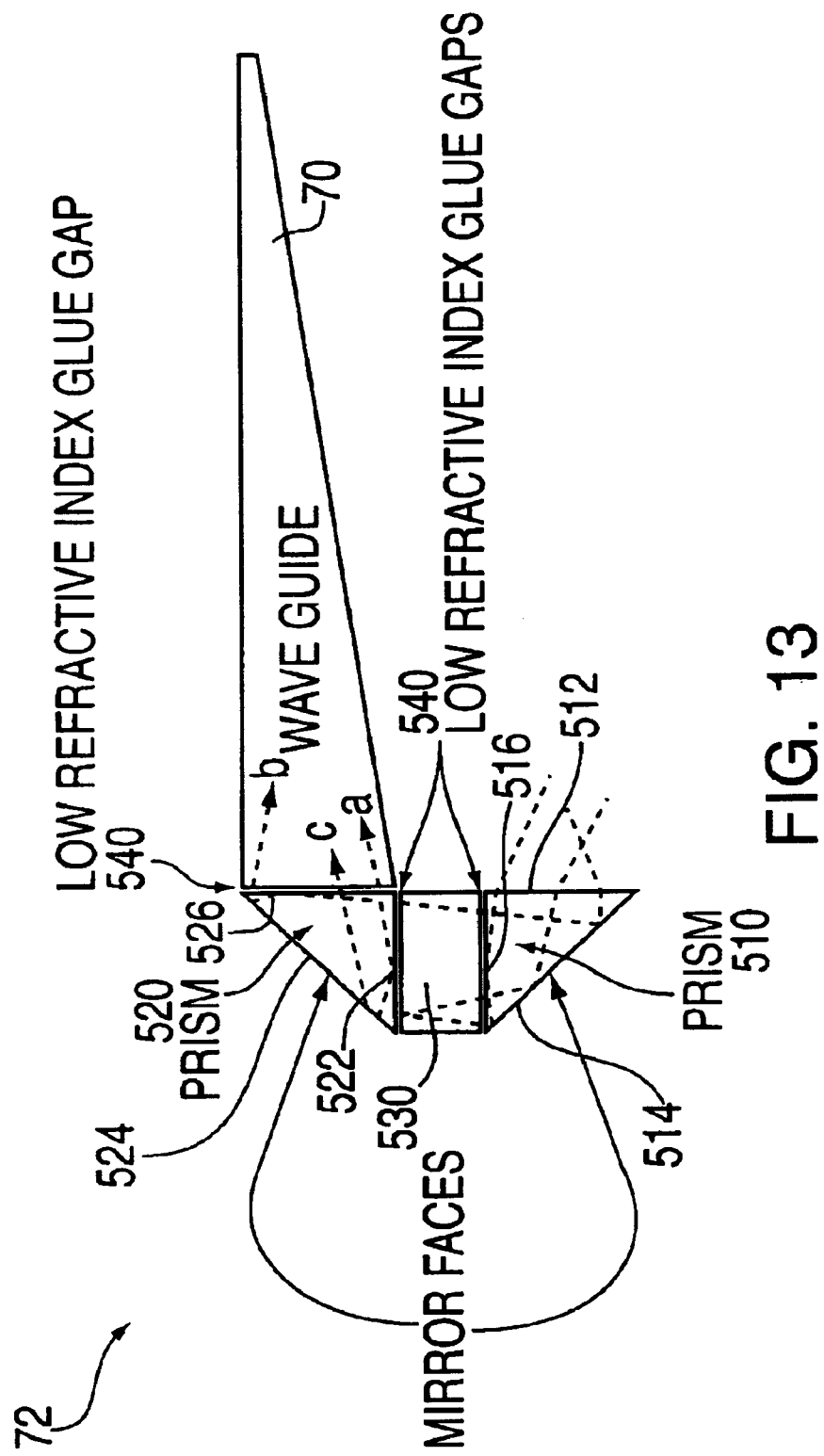

FIG. 13 illustrates the embodiment of the turn-the-corner assembly of FIG. 12 including a waveguide in accordance with an embodiment the present invention.

Figure 14:
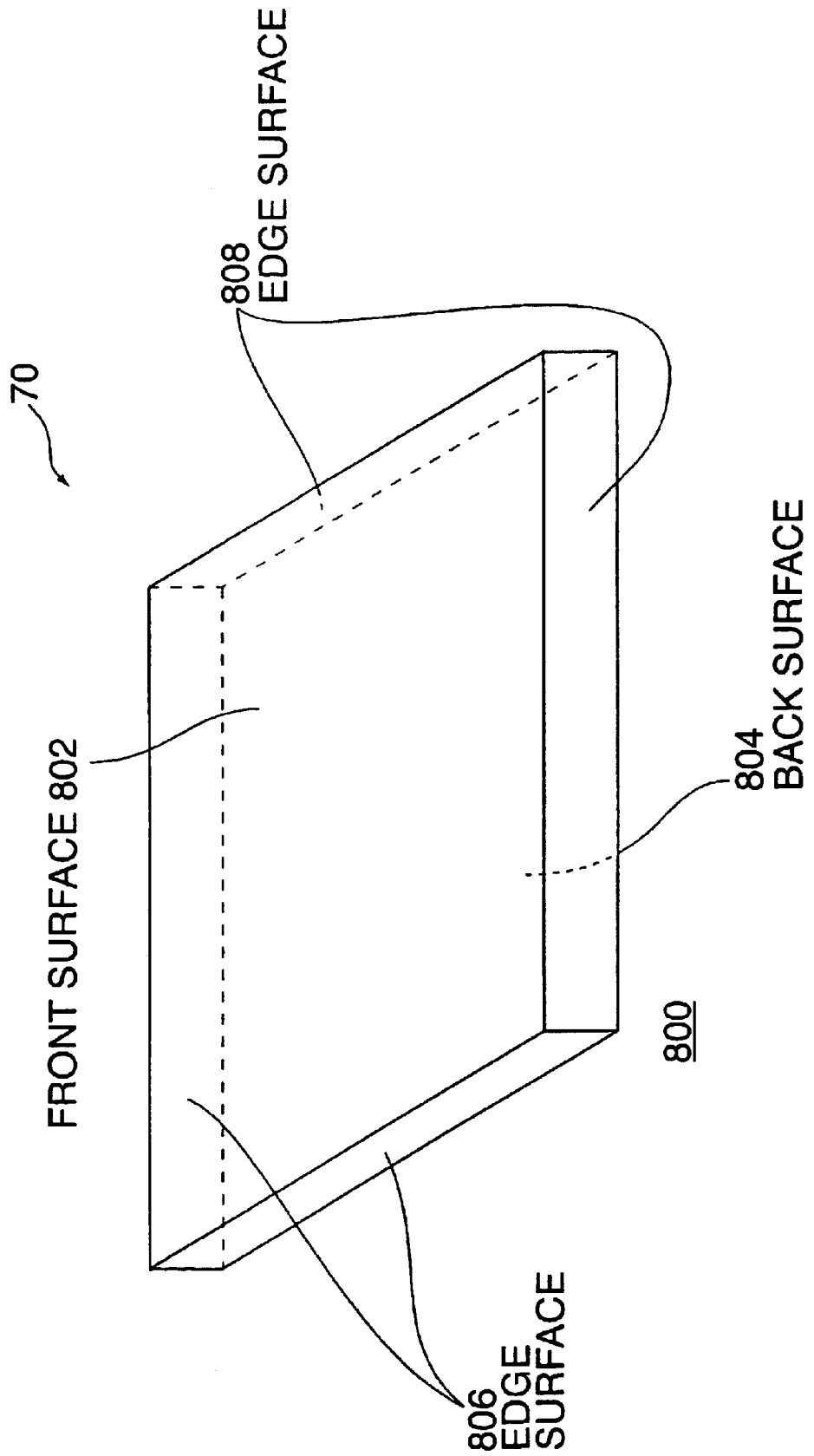

FIG. 14 illustrates a waveguide of the flat panel display system of FIG. 1A in accordance with the present invention.

FIG. 15 illustrates a bottom surface of a waveguide having a sawtooth surface of the flat panel display system of FIG. 1A in accordance with an embodiment the present invention.

FIG. 16 illustrates a bottom surface of a waveguide having a truncated sawtooth surface of the flat panel display system of FIG. 1A in accordance with a further embodiment the present invention.

FIG. 17 illustrates a conventional bottom surface of a waveguide having a pure stepped or truncated surface.

Figure 18:
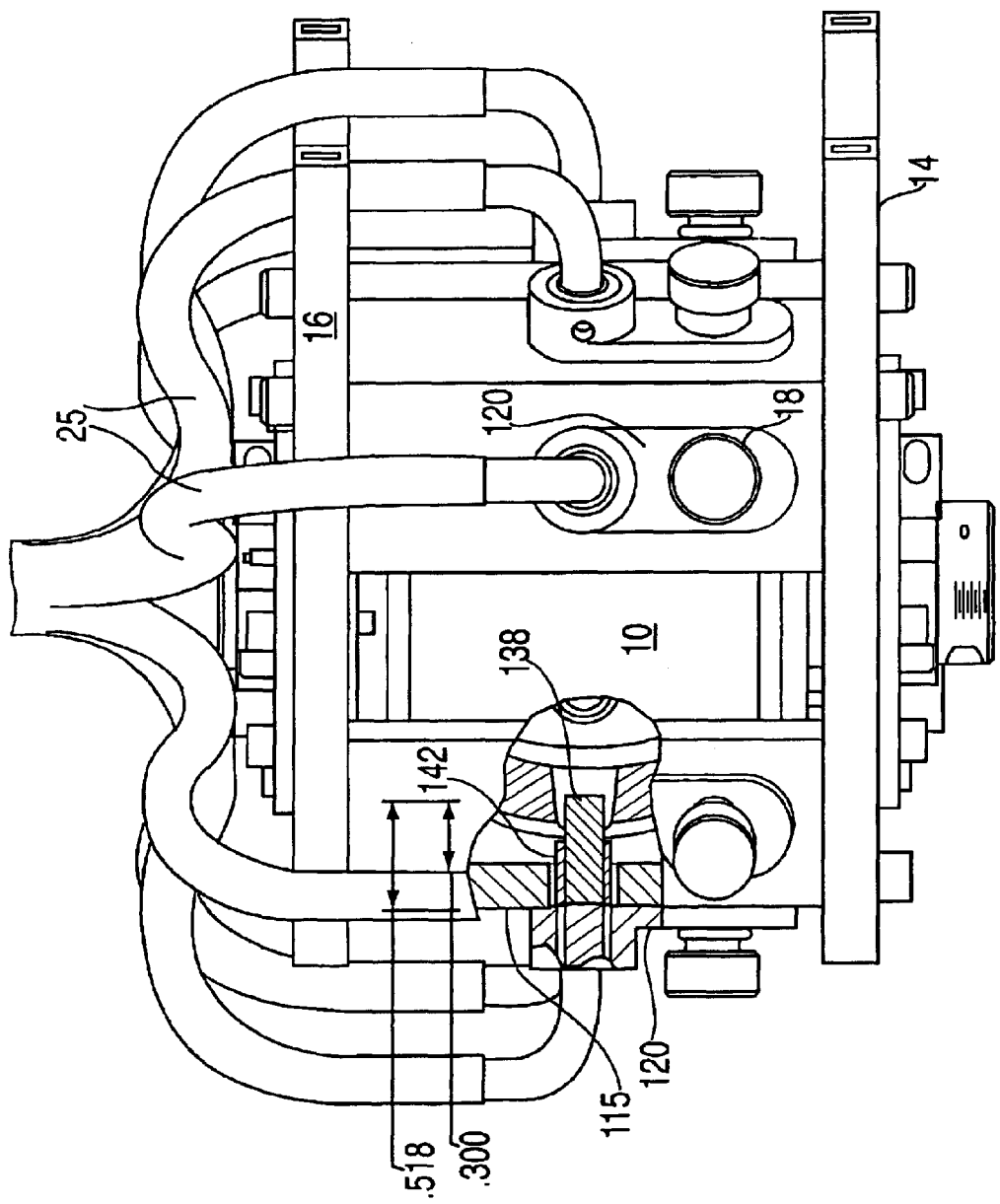

FIG. 18 is a side perspective view of a portion of the flat panel display system of FIG. 1A including a cylindrical glass rod and ferrule in accordance with the present invention.

Figure 19:
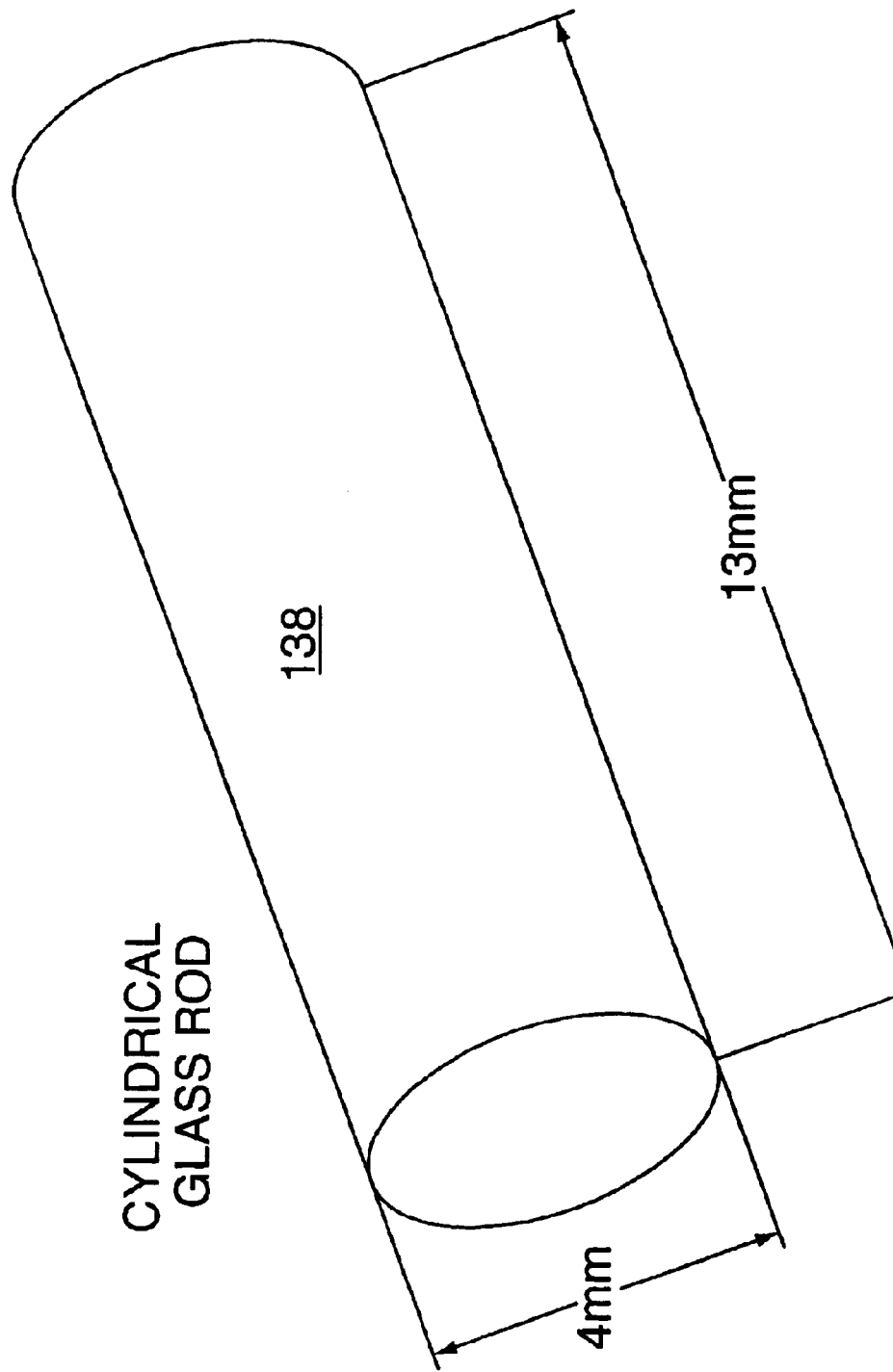

FIG. 19 illustrates the cylindrical glass rod of FIG. 18 in accordance with the present invention.

DETAILED DESCRIPTION OF THE INVENTION

Mode(s) for Carrying out the Invention

In an illustrative embodiment, the present invention is a high luminance, one-inch thick display system, although display systems with another thickness may be utilized as well. In accordance with the invention, the source of illumination is located remotely from the display device, such as an LCD and its accompanying waveguide, view screen, and backlight (if the display device is transmissive). The display device may be emissive, transmissive or reflective. The display is described below from the optical and mechanical point of view.

A schematic block diagram of a flat panel display system 5 in accordance with the present invention is shown in FIG. 1A, while portions of display system 5 are illustrated in FIGS. 1B, 1C, 2A and 2B. As will be described, such portions comprise peripherals that will be included in a remote enclosure, i.e., away from the display device. It should be understood that display system 5 is schematic in nature and the relative sizes, positions, and shapes of the components in the diagram are merely for ease of discussion.

As shown in FIGS. 1A–C and 2A and B, display system 5 includes a light-collecting assembly 20, which will be described in greater detail with reference to FIGS. 4A, 4B and 5–7, for focusing light from light source 12. Generally, light-collecting assembly 20 is designed to deliver visible light to its exit ports, although assembly 20 may be designed, alternatively, to deliver radiant fluxes, such as infrared (IR) light, ultraviolet (UV) light, and microwaves. Illustratively, light-collecting assembly 20 is approximately 3" by 4" by 3.6" high, and has a collection efficiency exceeding 70%. Its functional elements include an enclosed concentrated light source 12, such as a small-arc high intensity discharge (HID) lamp and a lamp enclosure comprising ellipsoidal mirrors 10. The light source 12 may be powered by a 270 W arc lamp, which may have an arc gap of 1.4 mm, although other lamp powers and/or arc gaps can be utilized. In addition, light source 12, except for electrode shadowing effects, is preferably a substantially omnidirectional radiator. Thus, the collecting assembly 20 can preferably provide two or more light outputs, by segmenting the output of omnidirectional light source 12.

As best seen in FIGS. 1B, 1C and 2A, the ellipsoidal mirror 10 are supported by a plurality of L-shaped support brackets 115. Each wing of the "L" is approximately 0.9" wide and 2.25" high. Specifically, FIGS. 1B and 1C show an assembly of four L-shaped support brackets 115, while FIG. 2A shows only two of the existing four brackets 115. As shown in FIG. 2A, each bracket has a pair of clearance through-holes (one on each side of the "L") 117, for allowing protrusion of the end ferrule of each fiber cable leg 25, and a pair of tapped holes 119 for securing each protruding fiber cable leg to its respective adjuster 120 by means of thumb screw clamp 18 shown in FIGS. 1B and 1C. Through-hole 117 is approximately 0.36" in diameter and tapped hole 119 is approximately 0.19" in diameter. Further, light source 12 and the ellipsoidal mirrors are supported by bottom and top hub plates (14, 16), each having approximate dimensions of 3" by 3.9" by 0.25" thick and having a diameter of 4.93". Further, the height from the top of top hub plate 16 to the bottom of bottom hub plate 14, when supporting the mirrors, is approximately 2.75".

To ensure that ellipsoidal mirrors 10 and mirror edge slots 112, which form exit port holes for light-collecting assembly 20, are properly aligned, it is desirable to build a suitable set of accurate datum surfaces into the design of the assembly. Efficient light extraction from the light source depends on such proper alignment. In FIG. 2A, the exploded view of light-collecting assembly 20 illustrates how various elements of the light engine are assembled and illustrates the design of the datum surfaces desired for alignment.

With reference to FIGS. 2A and 4A–4C, there are illustratively four ellipsoidal mirrors 10. The top and bottom of the four ellipsoidal mirrors 10 have cylindrical surfaces that engage cylindrical hubs of bottom and top hub plates (14, 16), respectively. The ellipsoidal mirrors 10 are securely held against the bottom and top hub plates (14, 16), bottom and top hub plates (14, 16) by garter springs 126 that engage matching torroidal grooves 127 ground into the backs of the ellipsoidal mirrors 10. The top and bottom of the light source 12 are held by means of a cylindrical clamp assembly 28, which is inserted into circular holes in the bottom and top hub plates (14, 16). These holes are concentric with the hubs and provide sufficient clearance for alignment of the light source 12 with a common focal point located in the center of the light-collecting assembly 20 and coincident with the common axis of both hubs.

As shown in FIGS. 2A and 2C, a special alignment washer 23 is disposed around the hub of the top hub plate 16. The top of the special alignment washer 23 is flat to engage the flat bottom surface of the top hub plate 16 while the bottom face of this washer has a conical taper to match the top faces of the ellipsoidal mirrors 10. Clocking alignment of each ellipsoidal mirror 10 about the hub axis is provided by notches 140 in the top corner edges of each mirror section (see FIGS. 4A–4C). Notches 140 have accurate reference datum surfaces that are normal to the bottom face of top hub plate 16. There are four raised key protrusions 21 from the bottom conical face of special alignment washer 23. Key protrusions 21 have eight accurate reference faces designed to engage the corresponding reference datum surfaces of the four ellipsoidal mirrors 10 notches. In order to provide clocking alignment of mirror edge slots 112 with corresponding through-holes 117 of L-shaped support brackets 115, a pin through-hole 29 is provided in special alignment washer 23 for engaging a corresponding pin in top hub plate 16. The four L-shaped support brackets and their eight through-holes 117 are accurately positioned with respect to the top hub plate 16 pin so as to ensure proper alignment of through-holes 117 with mirror edge slots 112.

Eight relatively tiny coil springs 38 are inserted into corresponding receptacles 39 in bottom hub plate 14 adjacent to the hub. The conical bottom faces of ellipsoidal mirrors 10 each engage two of these springs. Thus, each mirror section is spring-loaded toward top hub plate 16. This spring-loading action ensures that the top and bottom interfaces of special alignment washer 23 between the ellipsoidal mirrors 10 top conical faces and top hub plate 16 is kept in intimate contact with each other.

The spring-loading action of coil springs 38 and of garter springs 126 is an effective means of maintaining critical alignments in the presence of thermal dimensional distortions caused by heat generated by the lamp. This spring-loading method avoids producing stresses at the glass mirror interfaces that would crack the mirrors. Such stresses exist in conventional alignment methods that do not accommodate thermally induced dimensional distortions.

Advantageously, the unit cost of molding accurate glass surfaces is less than the cost of grinding them (and, of course, less than the cost of grinding and polishing them). Therefore, the critical surfaces of ellipsoidal mirrors 10 are preferably molded. These molded mirror surfaces include the ellipsoidal mirror surfaces, the top and bottom cylindrical hub interface surfaces, the top and the bottom conical interface surfaces, the notched top mirror clocking interface surfaces, and the ellipsoidal mirror 10 edge slot surfaces. To facilitate the glass molding process, all molded surfaces are designed to have draft angles if they are not otherwise shaped and/or oriented to accommodate release from the mold. For example, the top and bottom mirror edges are preferably configured to be conical instead of flat in order to accommodate easy mold release. For the same reason, the mirror edge slots 112 are preferably designed to have a draft angle.

FIGS. 4A, 4B, and 4C are side elevation, isometric, and assembly views, respectively, of the ellipsoidal mirrors 10 of light-collecting assembly 20 shown in FIGS. 1B and 1C. As shown in FIG. 4B, each ellipsoidal mirror 10 comprises two ellipsoidal mirror sections 110, which is preferable for ease of manufacture. Accordingly, each ellipsoidal mirror section 110 is positioned in such a way so as to have a first focal point common to all eight mirror sections 110 substantially centered on the arc of light source 12. Further, each ellipsoidal mirror section 110 has a second unique focal point, each of which is substantially centered on or near a respective mirror edge slot 112 that provides a cylindrical rod entrance port 125 (see FIG. 4C) for a corresponding cylindrical rod 138 (to be described in detail below). Thus, each ellipsoidal mirror focuses the light it intercepts from the arc on the corresponding cylindrical rod entrance port 125 located at or near the second focal point of this mirror. Note that each mirror edge slot 112 is aligned with a respective through-hole 117 shown in FIGS. 1B and 1C. Each cylindrical rod entrance port 125 is, e.g., 4 mm in diameter and intercepts light incident at 0.42 NA (numerical aperture).

As shown in FIGS. 1B, 1C and 4A–4C, there are illustratively eight mirror edge slots 112 (one for each ellipsoidal mirror section 110) and thus eight corresponding clearance through-holes 117. Note that each mirror edge slot 112 is formed by a half-hole in a mirror edge. Each ellipsoidal mirror section has two half-holes, one on each side, thus providing four mirror edge slots 112 and eight rod entrance ports 125 in the lamp enclosure. If it is desirable to maximize collection efficiency of the light engine, the diameter of each cylindrical rod entrance port 125 should exceed the theoretical size of the arc image formed by the corresponding ellipsoidal mirror section 110. The margin of excess should be designed to accommodate imaging aberrations, distortion of light rays by the glass envelope that encloses the lamp arc, and inaccuracies in the fabricated mirror surface shape and in the relative alignment between the mirror, the arc and the cylindrical rod. Enlarging the diameters of each cylindrical rod 138 requires a corresponding enlargement of each mirror edge slot 112 required for light egress. This reduces the area of the ellipsoidal mirror section 110 surfaces which, in turn, reduces light collection efficiency. The efficiency loss attributable to this reduction in mirror area is significant when, e.g., the mirror edge slot 112 area is large enough to become a significant fraction of the ellipsoidal mirror section 110 area.

Alternatively, it may be desirable to have a somewhat smaller diameter cylindrical rod 138 to provide a selected degree of compromise between light collection efficiency and the concentration of rod entrance port irradiance, which tends to be more intense near the rod center than near the rod edges.

In the design illustrated here, the rod entrance port diameter D was chosen to be:

$$D = (s2/s1)G + 0.51,$$

where s1 is the short distance along the major axis between the ellipsoidal mirror and its first (common) focal point, where s2 is the long distance along the major axis between the ellipsoidal mirror and its second (unique) focal point, and where G is the gap between the lamp arc electrodes.

In this illustrated example, s1=18.5 mm, s2=46.1 mm, G=1.4 mm, and the resulting D is 4 mm. In the above expression for D, (s2/s1) G is an estimate of the largest theoretical arc image size generated by reflection from any portion of the ellipsoidal mirror area. The additional 0.51 mm is for margin. As the above expression for cylindrical rod diameter D indicates, the magnitude of D is a strong function of mirror design configuration parameters s1 and s2, and of the lamp electrode gap G.

The illustrated light-collecting assembly 20 design comprising four ellipsoidal mirrors 10 formed from eight ellipsoidal mirror sections 110 is one of many possible alternative design configurations. For example, the collecting assembly could comprise a greater or a lesser number of ellipsoidal mirrors disposed about the arc, which would all have a common first focal point. As in the illustrated configuration, the second focal point of each mirror would be unique and would require a corresponding unique cylindrical rod entrance port for light egress. The greater the number of mirrors in the light-collecting assembly, the smaller would be the solid angle intercepted by each mirror as seen from the arc or from the corresponding cylindrical rod entrance port. This assumes that the mirrors surrounding the arc are all identical. Thus, these mirrors would each also have identical values of s1 and s2. The numerical aperture (NA), defined as the sine of the maximum angle of incidence of rays from the mirror on the corresponding cylindrical rod entrance port, is driven by the shape and projected area size of the mirror functional aperture and by the distance between the mirror and this entrance port. The 0.42 NA of the illustrated design of light-collecting assembly 20 represents a maximum (or nearly maximum) incidence angle of 25° for rays reflected by the mirror to the cylindrical rod entrance port surface. Of course, both the magnitudes of D and NA depend on the design of light-collecting assembly 20 and on the electrode gap G. However, for small values of G, the dependence of NA on G is weak.

The mirrors may be fabricated from materials such as glass or metal (not shown). Glass surfaces may have a dielectric coating (forming a thin-film cold mirror) that reflects visible light but transmits infrared and, possibly, UV light; thus reducing heat dissipation within the light-collecting assembly 20, in the cylindrical rods 138, and/or other optics following the cylindrical rods. Metal mirrors may be fabricated from diamond-turned aluminum, electro-formed nickel or a high-temperature polymer such as Ultem. Metal or polymer mirrors may be coated with aluminum, dielectric thin films, or other highly reflective coatings. As with glass mirrors, a dielectric coating can be used on metal mirrors to reflect visible light. However, unlike the coatings used on glass mirrors, which transmit infrared light, ultraviolet light, or both, dielectric coatings on metal mirrors are specially designed to reflect visible light while absorbing light outside the visible band. The heat generated by this absorption is then dissipated by conduction through the metal structure thus diverting heat from the mirror cavity.

Referring again to FIGS. 1B, 1C and 2A, light-collecting assembly 20 uses its ellipsoidal mirror surfaces to capture and channel the output of the light source 12. Light can be distributed from the light-collecting assembly mirror edge slots 112 by a light guide assembly, such as a plurality of fiber optic cables each of which functions as an optical transmission line. As shown, each of eight such fiber cable legs or bundles 25 cooperate with a corresponding rod entrance port 125. Each fiber cable leg 25 may be adjusted by a respective adjuster 120, depicted in FIGS. 1B and 1C, to ensure proper alignment. Note that each adjuster 120 is aligned with a corresponding fiber adjustment hole 117. Assuming that the number of exit ports is two or more (e.g., eight mirror edge slots 112 are illustrated), fiber cable legs 25 can be joined together within ferrule 30 to form a single path.

As shown in FIG. 2A, the ferrule 30 envelope can be cylindrical, while the fiber bundle exit port aperture of ferrule 30 is square. The dimensions of ferrule 30 are approximately 1.5" in length and 0.75" in diameter. Ferrule 30 is supported by a bracket 32, having dimensions of approximately 3.775" in length, 5" in width and 2.57" in depth. Bracket 32 similarly has a circular opening at one end and a square opening at the opposite end.

Referring now to FIG. 18, to diffuse hot spots and withstand high power densities, the input of each fiber leg 25 may be coupled to a respective ferrule 142. Each ferrule 142 can be support a thermally robust optically transmissive element or light pipe, such as a cylindrical rod 138, which can be air-spaced or bonded to their corresponding fiber bundles. Cylindrical rods 138 may be fabricated from solid glass (e.g., LaSFN31) having a high refractive index or from fused silica having a low refractive index. Note that the fibers from the eight fiber cable legs that collect light from each mirror edge slot 112 can be randomly mixed to provide a level of homogenization before the light emerges from a single common exit port within ferrule 30 and enters the next stage. An example of a cylindrical rod 138 is shown in FIG. 19. As illustrated, cylindrical rod 138 is 13 mm in length and 4 mm in diameter.

As shown in FIG. 1A, a beam homogenizer 40, which will be described in greater detail with reference to FIG. 8, receives light at input 44 from the output of ferrule 30. However, as further shown in FIGS. 1A and 2B, a dimmer 42, such as an iris, a variable neutral density filter, sliding apertures, or a liquid crystal shutter, can optionally precede homogenizer 40, to reduce or eliminate light to the homogenizer.

Homogenizer 40 creates a uniform irradiance over the cross-section of the output 46 of the homogenizer. The output of the homogenizer 40 is coupled to a second optical transmission line, such as an expanding fiber optic cable 50 shown in FIG. 1A, which has one input 52 and multiple outputs 54.

In the example of FIG. 1A, the light from the fiber optic cable 50 is coupled to a collimator 60. Collimator 60 may be a long tapered light pipe having a small area input port and a large area output port, e.g., a square cross section-tapered cone that functionally approximates a compound parabolic concentrator (CPC), a simple array of one or more such elements, or an array of lenses that collimate the light. The output of collimator 60 feeds a waveguide 70 that illuminates a display device 80 either directly or via a turn-the-corner prism assembly 72, which may be provided for the sake of compactness.

Collimated light is preferable for illuminating certain types of displays. For example, collimated light is desirable for backlighting certain liquid crystal displays (LCD) because the contrast is highest when the light incidence angles on the LCD are confined to a relatively narrow range. Conversely, diffused or uncollimated light will result in reduced contrast.

As previously mentioned, if the size or other constraints of the physical layout of display system 5 requires a change in the direction of the light traveling between the output of collimator 60 and waveguide 70, a turn-the-corner assembly 72 (having one or two prisms) may precede waveguide 70.

As shown in FIGS. 2A and 2B, many of the components of display system 5 can be placed in an enclosure 900 (and sealed by cover 905), referred to as a remote enclosure. Remote enclosure 900 provides a location for positioning elements of the display system away from the area of the display 80, e.g., a panel in a cockpit, where space is at a premium. The dimensions of the remote enclosure may be preferentially set to fit unique application requirements. For example, in an aircraft, the remote enclosure can have dimensions defined in the 3ATI, 5ATI or other size standards and thus be mounted in racks utilized by the instruments to be replaced by this invention. Thus, for the 3ATI size standard, the dimensions of the remote enclosure may be approximately 3" by 3" by 9". Accordingly, the need for any major structural changes to the aircraft is greatly reduced. Additionally, components that generate a great deal of heat can be located in the remote enclosure, away from heat-sensitive elements, where heat removal is more easily accomplished, and where envelope space restrictions are less severe.

As illustrated, the light source 10, the collecting assembly 20, the dimmer 42, the homogenizer 40, and associated brackets (previously described), are contained within remote enclosure 900. Fiber optic cable 50 connects the output of the homogenizer to the rest of the components (e.g., the collimator 60 and the waveguide 70). In addition, other components of the system, such as a power supply 910, a lamp drive 920, a video interface 930, an input/output module 940, and a processing module 950, can also be located in remote enclosure 900. It should be understood that depending on the requirements of a particular system and available space, one can choose to include or exclude any number of these items in or from remote enclosure 900.

Light-Collecting Assembly

FIGS. 4A, 4B, and 4C show the side, the isometric, and the assembly views of light-collecting assembly 20, respectively, of FIGS. 1B and 1C. As stated previously, light-collecting assembly 20 efficiently couples light from lighting device 12 to homogenizer 40. The collecting assembly segments the output of the lighting device through the mirror edge slots 112, optimizing the capture of light and improving the efficiency of the system. The isometric view of FIG. 4B shows one of the four ellipsoidal mirror sections 10 which comprise the lamp enclosure, where each of the four mirrors 10 comprises two mirror sections 110. Note that each of mirror sections 110 is an ellipsoid of revolution about the ellipsoid major axis. Accordingly, collecting assembly 20 has eight ellipsoidal mirrors 110 having a first common focal point at the center of the light engine cavity and a second unique focal point, not shared with any other ellipsoid, which is at one of the eight mirror edge slots 112 located near the edge of each adjacent ellipsoidal mirror 110. As previously discussed, each mirror 110 has a half-hole on one side, such that two adjacent mirrors 110 form each mirror edge slot 112.

As further discussed with reference to FIGS. 4C, 18 and 19, the mirror edge slots 112 can preferably interface with a respective transmissive element or optical light pipe, such as solid cylindrical rod 138. This light pipe may be coupled to a fiber optic cable (such as fiber leg 25), to another light pipe or to a solid core optical fiber.

The rods 138 are formed of a light transmitting material such as glass, fused silica, or sapphire to eliminate hot spots which might damage the fiber cable. In addition, to further shield optical fibers from the damaging effects of heat and/or UV radiation and to further protect the downstream optics, especially polymer optics and adhesives, the input port face of rod 138 can be coated with a dielectric IR, UV reflecting coating, and/or a visible light transmitting dichromic film. Further, instead of or in addition to such coating, the rods 138 may be made of a UV absorbing material or may be doped with a UV absorbing material such as cerium.

Referring specifically to FIG. 18, during operation (prior to reaching the downstream optics interface), the heat from the light source is absorbed by each rod and may be conducted out of each rod 138 and into heat conducting ferrule (or cell) 142 that supports the rod and serves as a heat sink. Ferrule 142 is preferably formed of a heat conducting material such as copper, aluminum, stainless steel, a combination thereof, or other suitable heat dissipating materials.

Each cylindrical rod 138 can be secured to its respective ferrule 142 by a thermally robust and optically clear adhesive or clamp (not shown). For an adhesive, it is preferable that the adhesive be able withstand a sustained temperature environment, which, for an epoxy such as Epoxy Technology's Epotek 301-2, is as high as 200° C., and that the adhesive has refractive index low enough to maintain total internal reflection (TIR) of the light propagated within the rod material.

For example, assume that for light rays originating in an air medium:

(1) The maximum ray angle of incidence on the polished entrance port face of a solid cylindrical rod is θ.
(2) The refractive index of the rod medium is N.
(3) The refractive index of the adhesive on the rod's polished cylindrical surface is n.

Then, in order for TIR to prevail for all light rays propagating within the rod, n is required be less than or equal to the square root of (N2−sin 2θ). Assuming the cylindrical rods 138 are made of LaSFN31 glass, for which N=1.88, and the maximum ray incidence angle from air medium is θ=250, then the corresponding maximum adhesive index of refraction that maintains TIR is n=1.83. Therefore, Epotek 301-2 epoxy is an example of an adhesive that maintains TIR because it has a refractive index of 1.564.

Alternatively, if the combination of the rod material and adhesive refractive indices causes TIR to fail, then an appropriately thick low refractive index coating, such as magnesium fluoride (which has a refractive index of 1.38) may be applied between the adhesive and the rod. If, however, a clamp is used to hold rod 138, the low refractive index coating is applied between the clamp and the rod surfaces to form a barrier layer.

Cooling Arrangements for the Light-Collecting Assembly

If a high-intensity light source 10 (such as a small-arc HID lamp) or other high-wattage lamps are employed, a cooling system is preferably incorporated in the system. In the preferred embodiment, illustrated in FIG. 5, assembly 200 includes a light source 12, approximately 3.575" in length, that is mounted inside a close-fitting tube 210, such that both are positioned on a suitable lamp fixture 220. The tube 210 may be cylindrical or assume any other appropriate shape, and can be fabricated from a clear material with good thermal conductivity, relative to air, such as fused silica or sapphire. As depicted, tube 210 is covered on one end by a cover 230 to form an enclosure.

The outer surface 212 of tube 210 is in physical contact with the mirrors 110 of the collecting assembly 20. This allows thermal energy generated by the light source 12 to flow to the tube 210 and then to the collecting assembly 20. Alternatively, cooling may be provided by attaching a metal conduit to the glass envelope of the lamp and anchoring the conduit to a heat sink (not shown).

An alternative light source and cooling assembly 300 is shown in FIG. 6. The assembly 300 has lighting source 12. In this embodiment, light source 12 may be a short-arc, metal halide HID lamp such as a 270 W version manufactured by a Japanese company, Ushio America, Inc. Thermal buses 330 of copper or other material having suitable heat conductivity couple the light source 12 at a minimum of two points and draw heat away from seal areas 350 to heat sinks 340. Each thermal bus 330 is approximately 1.07" long with a diameter of 0.75". The seal areas 350 are typically molybdenum foil conductors, which form a gas-tight seal when the lamp quartz envelope is heated and "pinched." The thermal buses 330 are designed such that the foil seal temperatures are maintained within a range recommended by the manufacturer, above which the seal would likely fail. This technique also takes advantage of the poor thermal conductivity of the foil, where minimal power from the lamp propagates through the thermal bus resulting in a low thermal variance.

The ellipsoidal light-collecting assembly 20 is also represented in FIG. 6. Heat absorbed by light-collecting assembly 20 will pass to heat sinks 340. To further reduce the foil seal temperature, filler material can be added between the thermal busses 330 and the quartz lamp 310 to fill in air voids, as air is a very poor thermal conductor. The filler material, however, should allow for the relative movements between the quartz and copper, should have low out-gassing characteristics, and should be able to withstand temperatures in excess of those recommended by the light manufacturer (such as 250° C.) in order to have sufficient safety margins. For example, one can use Nuclear Grade Style SW-GTA Grafoil® manufactured by the UCAR Carbon Company, Inc. of Cleveland Ohio. This Grafoil® material is a flexible, thermally conductive, and compressible graphite gasket material having an extremely low ash content while containing no binders or resins. The lack of binders and resins eliminates the possibility of high temperature-inducing out-gassing, which would risk the condensation of out-gassing vapors on the colder ellipsoidal mirror 10 surfaces thus degrading their reflectance efficiency. The entire assembly 300 may be forced-air cooled, provided that air does not impinge on any optical surface. As a result, a sealed mirror assembly can be used in relatively dirty environments, such as military and automotive applications. The cooling airflow rate can be adjusted to maintain temperatures within a range that optimizes lamp life.

Various other arrangements may be employed. For example, the light source can be sealed within light-collecting assembly 20 to form a closed-loop cooling system 400, as shown in FIG. 7. In this embodiment, air is circulated around the outside of the light-collecting assembly. Specifically, light source 12 is enclosed in a sealed collecting assembly 420. Clean air is forced past light source 12 by a fan 422 and the air is cooled in a plenum 430. The plenum and air conduit together forms a sealed assembly, which includes collecting assembly 420. The sealed space is required to prevent dirty air infiltration from outside the sealed space. Optionally, heat sinks, fans or other cooling devices (not shown) can be used to transfer heat away from the plenum 430.

In another arrangement (not shown), the lamp itself may be forced-air cooled provided that clean air is available. Instead of air, helium or a mixture of helium, neon and nitrogen may be employed to cool the surfaces.

Dimmer

As stated, dimmer 42 may be an iris, a variable neutral density filter, sliding apertures or a liquid crystal shutter. As shown in the detail of FIG. 3, dimmer 42 has two aperture plates 1010, 1020 that slide horizontally with respect to each other. As illustrated, each plate has a diamond-shaped aperture 1030. Optionally, there may be a filter, such as an NVIS filter, covering one of the diamond-shaped apertures, which could make a cockpit display compatible with night vision equipment. By virtue of the small size of this aperture, an NVIS filter located here is far less expensive, thinner, and otherwise far more compact than an NVIS filter placed in its usual location in front of and covering the entire LCD display backlight area.

In operation, as the plates 1010 and 1020 move together or apart, the size of the opening created by the overlap of the two diamond-shaped apertures 1030 varies, as desired. Note that the dimmer is preferably electromechanical in operation and has a dimming ratio of up to 300:1.

To attain greater dimming ratios up to (for example) 85,500:1, a two-stage dimmer can be configured by incorporating two apertures into one of the sliding aperture plates of FIG. 3. At any given translational position of this sliding aperture, only one, of its two apertures, has a transmitting area in common with the aperture in the other (single) aperture sliding plate. The sliding mechanism for this assembly should be designed to move both apertures so as to keep this common transmitting area centered on the common axis of the ferrule 30 fiber cable exit port and the homogenizer 40 entrance port aperture 44. This alignment maximizes the homogeneity of the light exiting exit port 46 of homogenizer 40.

The two-stage dimming is accomplished by means of a neutral density filter placed over one of the apertures of the two-aperture slide. The first stage of dimming would be accomplished by sliding the clear aperture of the two-aperture slide across the opening of the single aperture slide until the minimum size common area opening is reached. For the second stage of dimming, the neutral density filtered aperture of the two-aperture slide is slid across the opening of the single aperture slide until the minimum size common area opening is reached again. The neutral density of the filter is chosen such that its attenuation is equal to, or slightly less than, the maximum attenuation of the first stage of dimming. For example, for a first stage dimming range of 300:1, the neutral density could be 2.47, which would provide a dimming ratio of 295:1 when the common area of both sliding apertures is at its maximum. The maximum second stage dimming ratio would then be [295×300]:1 or 88,500:1.

An additional benefit of this two-stage dimming arrangement is that the NVIS filter can be combined with the neutral density filter on the other side of the same substrate, thus combining both functions. The neutral density of the combination would then be designed to be 2.47 in the example above. This removes the system efficiency reduction normally attributable to NVIS filters because the first dimming stage is NVIS-free.

Note that the minimum size limit for the common opening area between the two sliding apertures is governed by the increasing level of diffraction that occurs as the transmitting aperture becomes progressively smaller. This diffraction effect can become significant enough to cause decollimation to exceed the numerical aperture (NA) limit of the fibers in the downstream fiber optics cable. This would cause light absorption in the cables that would reduce their light transmission efficiency.

Further, even if the fiber numerical aperture (NA) is sufficient to accommodate this collimation loss, a significant decollimation can cause an undesirable alteration in the backlight collimation. The light transmission system between the light engine and the waveguide is designed to maximize preservation of étendue and to achieve a certain degree of collimation of light egress from the waveguide. Appreciable decollimation by the dimmer minimum aperture size would then result in an undesirable reduction of backlight collimation or in an undesirable change in performance as the dimming limit is approached.

Beam Homogenizer

The beam homogenizer 40, as shown in FIG. 8, can be fabricated from a square cross-section rod that is polished on all six faces. Preferably, homogenizer 40 is made of acrylic, BK7 glass, or other materials having low attenuation in the visible light region.

The square cross-section may be uniform for the entire length of the homogenizer or, as illustrated in FIG. 8, may be tapered. Specifically, homogenizer 40 has a large entrance port 44 and a small exit port 46. The homogenizer may be fabricated by being ground, diamond-turned, laser cut or drawn. Alternatively, a hollow, reflective air cavity having a square cross section may be employed. The length to width ratio of the homogenizer is selected such that the output is uniform at the homogenizer exit port. Length is dependent on the collimation of the input light, the refractive index of the homogenizer material, and the required degree of homogenization. Typically, length is in the range of ten times the width. Illustratively, the homogenizer 40 has a 13 mm by 13 mm square entrance port and an 8.4 mm by 8.4 mm exit port separated by a distance of 100 mm.

Further, the length of a tapered homogenizer may be less than the length of a uniform cross-section homogenizer, while providing the same degree of homogenization. Thus, a tapered homogenizer is typically more space-efficient than a homogenizer having a uniform cross-section.

Fiber Optic Cable

Fiber optic cable 50, shown in FIG. 1A, includes one common square input port designed to match the size and shape as homogenizer exit port 46. This fiber cable input port is bonded to exit port 46 by means of a clear adhesive to minimize loss of efficiency at the interface by eliminating the air gap and thus reducing Fresnel reflection losses. The fibers emerging from the input port are preferably bound within a jacketed cable having a nominally circular cross-section. The cable has a sufficient length, two feet for example, to feed the entrance port apertures of collimator array 60 shown in FIG. 1A. Thus, fiber optic cable 50 has one common square input port and a plurality of fiber cable exit ports. The transition from the single jacketed cable to a plurality of jacketed cables can be made at any convenient point along the length of the cable. The size and shape of the exit ports are designed to be a close match to the collimator array input ports.

Similar to the single fiber cable input port to the homogenizer exit port interface, each fiber cable exit port is bonded to a corresponding collimator entrance port by means of a clear adhesive, which is used to maximize transmission efficiency at the interface by reducing Fresnel reflection losses. The alignment of the mating apertures at the input and exit ports of the fiber optic cable is important to reduce coupling efficiency losses. Such alignment includes ensuring that the axes of the mating elements on both sides of the interfaces are parallel and centered with respect to each other. In addition, if the mating apertures are not circular, as is the case for the square apertures of the homogenizer exit port 46 and the fiber cable input port, the ports must be rotationally aligned about their common axis.

Further, it is possible to avoid the necessity of implementing extremely tight alignment tolerances by designing the entrance port apertures to be slightly larger than the adjacent exit port apertures. This maintains transmission efficiency by allowing the exit port apertures to slightly under-fill the adjacent corresponding exit ports. This under-fill technique provides the most benefit in cases where the mating apertures are smallest at, for example, the interfaces with the small collimator input port apertures. This is because smaller apertures require alignment tolerances to be more critical in order to reduce the resulting interface efficiency loss to a given budgeted allowance.

Array of Collimating Elements

FIGS. 10A and 10B show examples of collimating elements that could comprise collimator array 60 shown in the detailed schematic drawing of FIG. 9. As shown, the differences between the first collimator 160 and the second collimator 260 is that in input ports 165 of the first collimator 160 are substantially circular, while the input ports 265 of the second collimator 260 are substantially rectangular. However, the collimating elements of both embodiments are tapered in that they each have an exit port area larger than its entrance port area. The exit port ends are lined up side-by-side to form the array of collimators, such as in collimator array 60 illustrated in FIG. 9. The exit port apertures are preferably square or rectangular in shape to make it possible to fill the adjacent turn-the-corner prism assembly entrance port aperture, which has a long rectangular shape that spans the array of collimator exit ports. Filling this aperture with light is important to avoid the dark bands that would otherwise be projected from the resulting areas devoid of light, through the turn-the-corner prism, into the backlight, and across the display. It is advantageous for the optionally square or rectangular cross-section of the collimator element to be uniform for a portion of its length adjacent to its exit port. This allows the array of collimators constructed from these elements be stacked adjacent to each other with their sides in contact and their axes parallel and normal to the turn-the-corner prism assembly entrance port face. Such elements can be easily assembled on a flat surface with their exit ports in contact with the turn-the-corner prism assembly entrance port aperture. This arrangement ensures an easy means of alignment. The contacting faces of the collimator exit ports and the turn-the-corner prism assembly entrance port can be bonded together by means of an optically clear adhesive, which should have a sufficiently low refractive index relative to the prism index to maintain total internal reflection at the adhesive layer interface for light rays reflected by the prism hypotenuse face.

First collimator 160 of FIG. 10A shows a plurality of such elements forming a portion of a linear array that interfaces with a mating section of a turn-the-corner prism assembly. Each element has a input port 165 circular aperture and an exit port 168 square aperture 168. The circular input port 165 interfaces with a corresponding circular exit port of fiber optic cable 50.

Preferably, the exit port 168 of collimator 160 is 6.6 mm square. This dimension slightly overfills the height of the turn-the-corner prism assembly entrance port aperture. Thirty-three (33) of these 6.6 mm square collimator apertures arranged in a side-by-side tightly packed linear array are approximately 218 mm long, which is sufficient to overfill the length of the turn-the-corner prism assembly 72 entrance port aperture slightly. This overfill is desirable to avoid the creation of dark areas or stripes on the turn-the-corner prism assembly entrance port aperture. These stripes are devoid of light and the turn-the-corner prism assembly could project these stripes into the backlight and across the display. As shown in FIG. 10A, the square cross section portion of this collimator element has uniform dimensions of 6.6 mm by 6.6 mm until it begins to morph with the tapered circular cross section portion. The tapered portion has a conical shape that increases in diameter between the small circular entrance port and the larger square cross section.

The second collimator 260 of FIG. 10B shows a plurality of collimator elements similar to those of FIG. 10A, which likewise form a portion of a linear array that interfaces with a mating section of a turn-the-corner prism assembly. Each of these elements has an input port 265 square aperture and an exit port 268 square aperture. The square input port 265 interfaces with a corresponding square exit port of fiber optic cable 50.

Similar to exit port 168 of the first collimator 160, exit port 268 is preferably 6.6 mm². Thus, its interface with the turn-the-corner prism assembly 72 entrance port aperture and its overfill properties are identical with that of collimator 160.

The tapered portion of each collimator element of the second collimator 260 has a square cross-section that increases in size between the small square entrance port and the larger uniform square cross section region. Thus, instead of having the conical tapered section shape of each collimator element in the first collimator 160, the elements of the second collimator 260 each have a pyramidal shaped tapered section.

The design of the first collimator 160 is preferred over the design of the second collimator 260 because if the second collimator 260 is used, the fiber bundles of fiber optic cable 50 would be required to match the square input port 265 of the second collimator 260. Note that fiber bundles having square exit ports are more expensive and more difficult to fabricate than those with round ports.

A typical length for either the first collimator 160 or the second collimator 260, having a 6.6 mm square aperture, is 100 mm. A typical input port 165 of the first collimator 160 may have a diameter of 1.65 mm. A typical input port 265 of the second collimator 260 may be 1.462 mm². These typical input port sizes for both collimators would preferably have an equal input port area of 2.14 mm². Similarly, their identical 6.6 mm² exit port aperture areas of 43.56 mm2 are also equal.

The conical half angle of light entering the input port aperture, of both collimators 160 and 260, from the fiber bundle exit port of fiber optic cable 50 has an air-equivalent value of 35°. By application of Snell's law, the actual half-angle within a medium having a refractive index of N is given by $\psi$, where $\psi = \arcsin\{(\sin 35°)/N\}$. In accordance with principle of étendue conservation in an "ideal" system, the relationship of air-equivalent collimation half angles of light entering and light leaving the collimator ports is:

$$A_{in} \sin^2\theta_{in} = A_{out} \sin^2\theta_{out},$$

where $A_{in}$ and $A_{out}$ are the input and output port areas respectively, and where $\theta_{in}$ and $\theta_{out}$ are the corresponding air-equivalent light input and light egress conical half-angles, respectively. Calculating the value of $\theta_{out}$ when $\theta_{in} = 2.14$ mm², $A_{out} = 43.56$ mm², and $\theta_{in} = 35°$, yields a corresponding ideal value of $\theta_{out}$ of 7.3°, which is achievable by a properly configured compound parabolic concentrator (CPC) used as a collimator element. However, more realistically, the $\theta_{out}$ actual value for collimators 160 and 260, which approximate the performance of the ideal CPC, would be about 9° or 10°.

Another embodiment of a collimator is shown in FIG. 11. In particular, a packed triangular air cavity array 1110 includes a plurality of tapered air cavities 1112 having right triangular cross-sections in a plane normal to an axis that bisects the hypotenuse face. As shown, the array is sandwiched by hypotenuse face mirrors 1114. This embodiment functions in the same manner as a square array, since the mirror image of the right isosceles triangle, reflected in its hypotenuse face, forms a square. The small seams between each right triangle are at a 45° angle relative to the top and bottom surfaces.

Turn-the-Corner Assembly

As previously stated, it may be necessary to redirect the light (due to space constraints) from collimator 60 before it enters waveguide 70. FIGS. 12 and 13 illustrate turn-the-corner assembly 72, where FIG. 12 shows greater detail and FIG. 13 includes waveguide 70.

Turn-the-corner assembly 72 of FIGS. 12 and 13 includes two prisms 510 and 520 separated by an optional transmissive spacer element 530. By adding spacer element 530, it is possible to increase the gap between the input and output light bundles. The gap can be adjusted to the desired size by varying the spacer thickness.

Prism 510 includes a first face 512, a second face 516 perpendicular to face 512, and a mirrored hypotenuse face 514. Similarly, prism 520 includes a first perpendicular face 526, a second perpendicular face 522, and a mirrored hypotenuse face 524. All faces of the prism and of the spacer, including their end faces, are polished. The dimensions of the prisms and the spacer may be designed so as to capture and transmit light with maximum efficiency. For example, first and second faces of prisms 510 and 520 may be 6 mm, while the hypotenuse face of prisms 510 and 520 may be 8.49 mm.

Prisms 510, 520 and spacer element 530 may be formed of a transparent polymer material such as acrylic or polycarbonate. Alternatively, glass, such as fused silica, F2, or BK7 can be used, as well as a combination of these materials. If necessary, the prism hypotenuse faces can be coated with aluminum, silver, a multilayer dielectric film, or other mirror coating 542. Alternatively, a sufficiently high refractive index material, such as LaSFN31 glass, can be used to form the prisms and spacer element, which eliminate the need for a mirror coating by maintaining TIR for the entire range of light ray angles incident on the prism hypotenuse air/glass interfaces. For example, the hypotenuse faces of right angle prisms made of LaSFN31 glass, which has a refractive index of 1.88, will completely internally reflect all light rays incident on the prism entrance port from air medium at angles of 24.5 degrees or less.

The prism entrance and/or exit port faces may, optionally, be bonded to adjacent transmissive elements, such as the waveguide 70 entrance port and/or the collimator 60 array exit port, by means of a TIR-maintaining adhesive having a refractive index sufficiently lower than that of the prism material. When the turn-the-corner prism assembly entrance port has a refractive material interface instead of air, the entrance port incidence angle for determining whether TIR is maintained on the hypotenuse face is the air-equivalent angle rather than the actual angle.

As an example, in operation, and as shown by the dotted-line examples a, b, c, light enters the entrance port of assembly 72 at the first perpendicular face 512 of the first prism 510. The rays of light reflect off mirrored face 514 and passes out through second perpendicular face 516. Thereafter, it passes through the spacer 530 and enters second perpendicular face 522 of the second prism 520, reflects off mirrored face 524, passes out through first perpendicular face 526, and is then transmitted to waveguide 70.

An interface adhesive 540, having a low index of refraction, may be placed between each adjoining surface to improve the light-handling efficiency of the assembly. Depending on the physical layout of the components in a given application and the degree of redirection required, the first prism 510 and/or the spacer 530 may be omitted. If both are omitted, the light input port for the turn-the-corner prism would be at the second perpendicular face 522 of prism 520. If only prism 520 is omitted, light would enter through the bottom of spacer 530 on the face parallel to second perpendicular face 522.

Waveguide Assembly

As previously discussed, light is transmitted to display device 80 via waveguide 70. Waveguide 70 is shown in detail in FIG. 14. As illustrated, waveguide 70 has a relatively thin planar structure, having a front surface 802, a back surface 804, and two edge surfaces 806 and 808. The approximate dimensions of waveguide 70 are 162.5 mm by 215 mm by 6 mm thick. The waveguide is preferably acrylic and has a refractive index of 1.485, although materials such as glass or other optical polymers may be used.

In operation, collimated light is injected at normal incidence into one or both of the edge surfaces 806 and 808. As light travels inward from the edges 806 and 808 toward the center of the waveguide 800, non-smooth surface features (on the back surface 804) redirects light toward the front surface 802, causing the light to exit the front surface at a predetermined angle relative to the normal to the surface 802. Inventive back surface features will be later described with reference to FIGS. 15 and 16 vis-a-vis the conventional back surface features illustrated in FIG. 17.

A thick low-index coating (not shown) may be placed between the waveguide and an underlying aluminum or protected silver reflective layer (not shown) to maximize the use of TIR. Additionally, a broadband retarder and reflective polarizing film (not shown) can be placed on the front surface 802 of waveguide assembly 70. Suitable films are commercially available from Japanese company NittoDenko, America, Inc. of Fremont, Calif. Such films pass light of one polarization, but reflect light of the opposite polarization. The reflected light will undergo two quarter phase shifts (the first for the first pass-through from the retarder film and the second upon being reflected by the aluminized coating) and return through the retarder film.

The front surface 802 and the four edge surfaces 806 and 808 may be flat, while the back surface 804 may have surface features designed to redirect the received collimated light. For example, a conventional surface, shown in FIG. 17, comprises an array of steps or terraces that are parallel to front surface 802. However, the purely terraced surfaces of FIG. 17 have disadvantages in relation to the inventive sawtooth bottom waveguide surface of FIG. 15 and the inventive truncated sawtooth bottom waveguide surface of FIG. 16, as will be discussed below.

The inventive sawtooth pattern bottom surface for waveguide 70 is shown in FIG. 15. As shown, light enters the input port face on one side. The sawtooth extraction features on the bottom face are shown greatly enlarged from their actual size for illustration purposes. Illustratively, the height of each sawtooth is approximately 0.195 mm and the pitch of the sawtooth array is approximately 0.39 mm. In this embodiment, all light rays that are intercepted by the bottom sawtoothed array are extracted. Further, in operation, the array redirects light out of the waveguide at predetermined angles based on the size and shape of the horizontal sawtooth surface.

A staggered or truncated-sawtooth pattern bottom surface for waveguide 70 is illustrated in FIG. 16. This surface has sawtooth features staggered on a series of terraces that are parallel to front surface 802. Illustratively, the height of each sawtooth is approximately 0.039 mm and the pitch of the sawtooth array is approximately 0.39 mm. The terraces may be mirror-coated with materials such as an aluminized coating to prevent refraction through the sloped surfaces. The design of the surface features is critical to maintain the desired exit angle, to preserve collimation of light traveling through waveguide, to maintain the spatial uniformity of light exiting through the front surface, and to simplify manufacture. In particular, spatial non-uniformities, such as those caused by waveguide material extinction properties can be compensated for by varying the pitch of the light extraction features or their step height.

Most of the light on the sawtooth terraced faces in FIG. 16 is reflected by "totally internal reflection" (TIR), so that it re-reflects the light to the top face, after which the light has an additional opportunity to be intercepted and extracted by a sloped facet. In this manner, each ray entering the waveguide "runs the gauntlet" of terraces and sloped facets until it is either intercepted by a sloped facet and extracted or it exits the thin end face of waveguide 70.

The truncated-sawtooth design of FIG. 16 is significantly better in performance than the conventional stepped or terraced surface designs (e.g., of FIG. 17) since such surfaces have two 450 corners per step for the light to strike head-on. Conversely, the truncated sawtooth-pattern surface has only one 450 corner per step for light to strike head-on. Further, since the corners of the conventional terraced surface cannot be manufactured as "dead-sharp," the light will decollimate once striking head-on a "rounded" corner. Analysis has shown that these rounded corners make up almost 50% of the decollimation of light. Thus, a lesser percentage of rounded corners is desirable, as occurs with the truncated-sawtooth design of FIG. 16.

The slope angles of the sawtooth faces of FIGS. 15 and 16 are illustratively at a 45° angle relative to the waveguide front surface 802. They are also "clocked" around display 80 normal, such that the lines formed by the intersection of the sawtooth faces with each other (in FIG. 15) or with the sawtooth-terraced faces (in FIG. 16) are parallel to the waveguide entrance port edge face. This arrangement produces a direction of propagation for the light extracted from the waveguide that is perpendicular to waveguide front surface 802.

However, some LCDs have other preferred directions of light propagation for maximizing contrast that differs from the display's normal direction. Therefore, to maximize contrast in a display, it is always desirable to match the propagation direction of light extracted from the waveguide to the direction of optimum propagation (otherwise known as the "sweet spot") for a given LCD display.

By varying the sawtooth face angle from 45°, the extracted light propagation direction can be varied from that which is perpendicular to the waveguide front surface 802. Without varying the "clocking" angle of the sawtooth features, the relationship between the sawtooth face deviation angle θ from 45 degrees and the propagation direction deviation angle ψ to the perpendicular to the waveguide front surface is:

$$\theta = (1/2)\sin^{-1}((\sin \psi)/n),$$

where n is the refractive index of the waveguide material. This applies for ψ variations in the plane containing both the normal to the waveguide front face and the propagation direction of the light entering the waveguide.

For ψ variations not in the plane containing both the normal to the waveguide front face and the propagation direction of the light entering the waveguide, it is necessary to rotate or "clock" the sawtooth features around the waveguide front face normal. In this case the desired ψ is a function of both "clocking" angle β and sawtooth face deviation angle θ from 45 degrees.

The illumination portion of the invention may be used in a wide variety of applications, including, but not limited to, vehicle lighting, search lights, task lights and projection systems. The display system can be utilized in vehicle applications, such as an airplane cockpit, as well as other applications where viewing angles, space, thermal, and/or structural issues are of concern.

List of Acronyms used in the Detailed Description of the Invention

The following is a list of the acronyms used in the specification in alphabetical order.

| | |
|---|---|
| ATI | Air Transport Indicator (standard instrument size) |
| CPC | compound parabolic concentrator |
| D | rod entrance port diameter |
| G | gap between lamp arc electrodes |
| fL | foot-Lambert |
| G | gap between lamp arc electrodes |
| HID | high intensity discharge (lamp) |
| IR | infrared (light) |
| LCD | Liquid Crystal Display |
| mm | millimeters |
| n | refractive index (of rod medium) |
| N | refractive index (of adhesive) |
| NA | numerical aperture |
| s1 | short distance along the major axis (of an ellipse) |
| s2 | long distance along the major axis (of an ellipse) |
| TIR | total internal reflection |
| UV | ultraviolet (light) |
| θ | maximum ray angle of incidence |

Terminology used in the Detailed Description of the Invention

The following terminology, listed below in alphabetical order, is used throughout the specification.

Snell's Law The law of internal reflection.

Alternate Embodiments

Alternate embodiments may be devised without departing from the spirit or the scope of the invention.

What is claimed is:

1. A non-imaging optical system comprising:
    (a) an array of hollow reflective elongated elements, each element comprising, a near end aperture and a distal end aperture; wherein
        (i) the cross-section of each of said elements is triangular in shape between its near end aperture and its distal end aperture and the area of said cross-section is smallest at the near end aperture of said element and tapers so that it is largest at the distal end aperture of said element, and
        (ii) each one of said elements abuts an adjacent other of said elements in said array; and
    (b) reflective top and bottom plates affixed to said array.

* * * * *